US012422216B1

United States Patent
Rogers et al.

(10) Patent No.: US 12,422,216 B1
(45) Date of Patent: Sep. 23, 2025

(54) TECHNIQUES FOR DETERMINING A GRIP LAYOUT TO IMPROVE GUN ERGONOMICS

(71) Applicant: Biofire Technologies Inc., Broomfield, CO (US)

(72) Inventors: Bryan Edward Rogers, Aurora, CO (US); Jules Woolf Kramer, Denver, CO (US); Benjamin William Dwyer, Golden, CO (US); Shayna Rochelle-Ann Thomson, Westminster, CO (US); William Ward, Denver, CO (US); Kai Thorin Kloepfer, Denver, CO (US)

(73) Assignee: Biofire Technologies Inc., Broomfield, CO (US)

( * ) Notice: Subject to any disclaimer, the term of this patent is extended or adjusted under 35 U.S.C. 154(b) by 0 days.

(21) Appl. No.: 18/777,979

(22) Filed: Jul. 19, 2024

Related U.S. Application Data

(63) Continuation of application No. 18/150,438, filed on Jan. 5, 2023, now Pat. No. 12,044,501.

(60) Provisional application No. 63/266,496, filed on Jan. 6, 2022.

(51) Int. Cl.
*F41A 23/10* (2006.01)
*F41A 17/06* (2006.01)
*F41C 23/10* (2006.01)
*G06V 40/10* (2022.01)

(52) U.S. Cl.
CPC ............ *F41C 23/10* (2013.01); *F41A 17/066* (2013.01); *G06V 40/117* (2022.01)

(58) Field of Classification Search
CPC ......... F41C 23/10; F41C 23/16; G06V 40/117
See application file for complete search history.

(56) References Cited

U.S. PATENT DOCUMENTS

| 12,044,501 | B1 * | 7/2024 | Rogers | G06V 40/117 |
| 2015/0081076 | A1 | 3/2015 | Fernandes | |
| 2016/0341517 | A1 | 11/2016 | Williams | |
| 2021/0275074 | A1 | 9/2021 | Freehill et al. | |

* cited by examiner

*Primary Examiner* — J. Woodrow Eldred
(74) *Attorney, Agent, or Firm* — Perkins Coie LLP; Andrew T. Pettit

(57) ABSTRACT

The present disclosure provides systems and techniques for determining a grip layout for a gun. The techniques include obtaining an image depicting a hand, obtaining calibration data associated with the image, calculating a real distance between a first landmark of the hand and a second landmark of the hand, and determining a grip layout for the gun based on the real distance between the first landmark and the second landmark. Calibration data may include a scale for the image or data that may be used to derive the scale, such as an object of known dimensions, an angular field of view, or a distance between the device used to capture the image and the hand. The grip layout may include a backstrap size, a sensor size, a sensor location on the gun, or any combination thereof.

18 Claims, 18 Drawing Sheets

TECHNIQUES FOR DETERMINING A GRIP LAYOUT TO IMPROVE GUN ERGONOMICS

CROSS-REFERENCE TO RELATED APPLICATIONS

This application is a continuation of U.S. application Ser. No. 18/150,438, titled "TECHNIQUES FOR DETERMINING A GRIP LAYOUT TO IMPROVE GUN ERGONOMICS" and filed on Jan. 5, 2023, now U.S. Pat. No. 12,044,501, which claims priority to U.S. Provisional Application No. 63/266,496, titled "TECHNIQUES FOR DETERMINING A GRIP LAYOUT TO IMPROVE GUN ERGONOMICS" and filed on Jan. 6, 2022, which are incorporated by reference herein in their entireties.

FIELD OF TECHNOLOGY

The teachings disclosed herein generally relate to guns, and more specifically to grip layouts for guns.

BACKGROUND

The term "gun" generally refers to a ranged weapon that uses a shooting tube (also referred to as a "barrel") to launch solid projectiles, though some instead project pressurized liquid, gas, or even charged particles. These projectiles may be free flying (e.g., as with bullets), or these projectiles may be tethered to the gun (e.g., as with spearguns, harpoon guns, and electroshock weapons such as TASER® devices). The means of projectile propulsion vary according to the design (and thus, type of gun), but are traditionally effected pneumatically by a highly compressed gas contained within the barrel. This gas is normally produced through the rapid exothermic combustion of propellants (e.g., as with firearms) or mechanical compression (e.g., as with air guns). When introduced behind the projectile, the gas pushes and accelerates the projectile down the length of the barrel, imparting sufficient launch velocity to sustain it further towards a target after exiting the muzzle.

Most guns use compressed gas that is confined by the barrel to propel the projectile up to high speed, though the term "gun" may be used more broadly in relation to devices that operate in other ways. Accordingly, the term "gun" may not only cover handguns, shotguns, rifles, single-shot firearms, semi-automatic firearms, and automatic firearms, but also electroshock weapons, light-gas guns, plasma guns, and the like.

Significant energies have been spent developing safer ways to use, transport, store, and discard guns. Gun safety is an important aspect of avoiding unintentional injury due to mishaps like accidental discharges and malfunctions. Gun safety is also becoming an increasingly important aspect of designing and manufacturing guns. While there have been many attempts to make guns safer to use, transport, and store, those attempts have had little impact.

SUMMARY

The systems and techniques described herein support determining a grip layout for a gun. The term "gun," as used herein, may be used to refer to a lethal force weapon, such as a pistol, a rifle, a shotgun, a semi-automatic firearm, or an automatic firearm; a less-lethal weapon, such as a stun-gun or a projectile emitting device; or an assembly of components operable to selectively discharge matter or charged particles, such as a firing mechanism.

Generally, the systems and techniques described herein enhance the ergonomics of guns by providing a grip layout that allows the user of the gun to achieve a strong yet comfortable grip of the gun. Additionally, the gun may include a biometric sensor, and the grip layout may facilitate the rapid and reliable collection of biometric data from the user by the biometric sensor. Aspects of the techniques described herein may include obtaining an image depicting a hand, obtaining calibration data associated with the image, calculating a real distance between a first landmark of the hand and a second landmark of the hand, and determining a grip layout for the gun based on the real distance between the first landmark and the second landmark. The calibration data may include a scale for the image or data that may be used to derive a scale, such as an object of known dimensions within the image, an angular field of view of the device used to capture the image, or a distance between the device used to capture the image and the hand at the point in time at which the image was captured. The first landmark may represent a tip of a third digit of the hand (e.g., the tip of the middle finger) and the second landmark may represent a base of the hand (e.g., where the hand meets the wrist). The grip layout may include a backstrap size, a sensor size, a sensor location on the gun, or any combination thereof.

Figure 1:
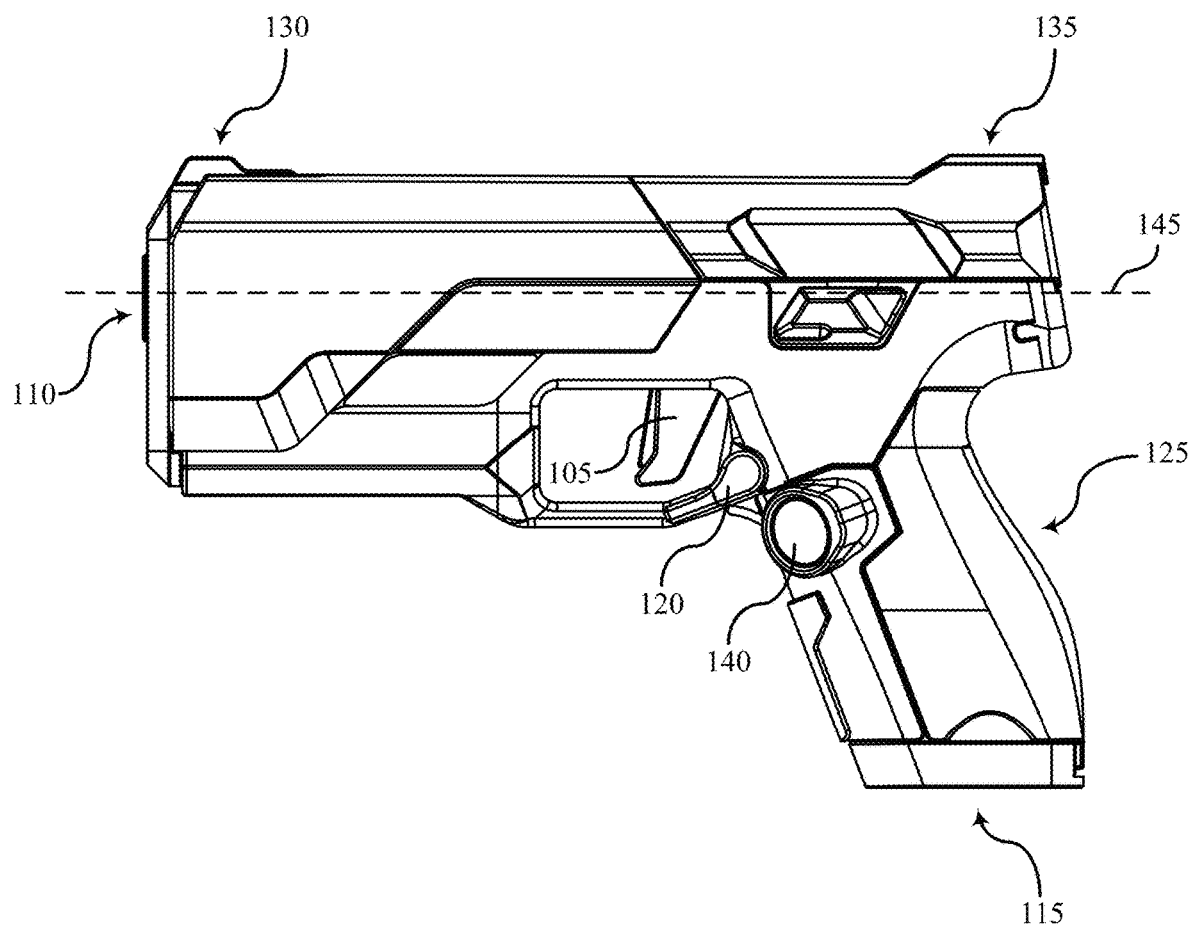
FIG. 1 illustrates an example of a gun including a grip layout.

Various features of the technology described herein will become more apparent to those skilled in the art from a study of the Detailed Description in conjunction with the drawings. Various embodiments are depicted in the drawings for the purpose of illustration. However, those skilled in the art will recognize that alternative embodiments may be employed without departing from the principles of the technology. Accordingly, the technology is amenable to modifications that may not be reflected in the drawings.

DETAILED DESCRIPTION

When purchasing a conventional gun, a customer often identifies a gun size (e.g., full size, compact, sub-compact, etc.) that feels most comfortable by handling multiple guns of various sizes. The customer generally desires a gun that comfortably fits in their hand while allowing them to easily reach and manipulate the trigger with their index finger (also referred to as the "second digit"). In some cases, a customer may modify the grip of the gun to improve the ergonomics of the gun. For example, some guns support interchangeable backstraps, thereby enabling customers to modify the grip layout to better fit their hand.

When a customer is purchasing a gun with an embedded sensor (e.g., a biometric sensor, a presence sensor, etc.), the importance of selecting an appropriate grip layout is magnified. For example, a gun may include a biometric sensor (e.g., a fingerprint scanner, a vein pattern reader, etc.) located on the gun in a position that allows the sensor to collect biometric data in response to the customer assuming a natural grasp of the gun, and an improper grip layout can prevent the biometric sensor from collecting biometric data. The grip layout of a gun is important to ensure comfort while handling the gun, and the grip layout is particularly important when the gun includes a sensor configured to collect data in response to a customer grasping the gun.

Introduced here, therefore, are systems and techniques for determining an ergonomic grip layout that facilitates the reliable collection of biometric data in response to a customer (also referred to as a "user") grasping the gun. The grip layouts described herein facilitate collecting data via a sensor embedded in the gun while also delivering a comfortable and familiar grip. A grip layout can include a backstrap size, a sensor size, a sensor location, or any combination thereof. As an illustrative example, a gun may support multiple fingerprint scanner sizes which may be located in a forward position, a middle position, or a rearward position of a fingerprint scanner region, and the gun may also support multiple backstrap sizes. Determining an appropriate fingerprint scanner location and backstrap size for a customer allows the customer to manipulate the trigger with their index finger while the fingerprint scanner collects a fingerprint from the middle finger (also referred to as the "third digit") of the customer, all while the customer assumes a natural grasp of the gun.

The grip layout may be determined based on an image depicting a hand of the customer. The customer may be the owner of the gun, an individual who is shopping for a gun, or an individual who is allowed to operate the gun. The hand may be the actual hand of the customer or a profile of the hand, such as a heat-transferred profile of the hand, an ink outline of the hand, a tracing of the hand, or the like. In other words, the image may depict a three-dimensional hand or a two-dimensional profile of the hand. Generally, a hand includes five digits, which may be referred to as a thumb (also referred to as a "first digit"), an index finger (also referred to as a "second digit"), a middle finger (also referred to as a "third digit"), a ring finger (also referred to as a "fourth digit"), and a pinky finger (also referred to as a "fifth digit"). The customer may use a device (e.g., a computer, a mobile phone, a digital camera, etc.) to capture an image of the hand, and a grip layout prediction procedure may be performed based on the image to predict a grip layout for the customer. The grip layout prediction procedure may be performed based on calibration data (e.g., a fiducial marker, a known distance between the device and the hand, a known angular field of view of the device, etc.) associated with the image. The calibration data may be used to convert an in-image size of the hand to a real size of the hand, and the real size of the hand may be used to determine the grip layout. In some examples, the captured image may include a fiducial marker (e.g., a grid of known size, a ruler, an icon of known dimensions, etc.) that can be used as an indication of scale. In some additional or alternative examples, the captured image may be associated with an indication of the distance between the device and the hand at the point in time at which the image was captured that can be used to determine the real size of the hand. Calibration data may be used as part of the grip layout prediction procedure to determine the size of the actual hand that is depicted in the image.

The grip layout prediction procedure may determine the distance between landmarks of the hand depicted in the image, such as the distance between the tip of the third digit (e.g., the middle finger) and the base of the hand (e.g., where the hand meets the wrist), compare the determined distance to a threshold distance, and select a backstrap size and/or a sensor location based on comparing the determined distance to the threshold distance. In some examples, the grip layout prediction procedure may select one or more aspects of the grip layout based on a machine learning procedure. For example, an operator (e.g., an employee or partner of the gun manufacturer) may train a model (e.g., an artificial neural network, a convolutional neural network, a random forest, etc.) with training data that contains images depicting hands, and each image of the training data may be associated with a label indicating a hand landmark location, a distance between hand landmarks, an appropriate sensor location (e.g., forward, middle, rearward, etc.), an appropriate sensor size (e.g., small, medium, large, etc.), or an appropriate backstrap size (e.g., small, medium, large, etc.). The trained model may receive an image depicting a hand as input and generate a sensor size, a sensor location, or a backstrap size as output. A label may include metadata associated with an image in the training data or an annotation of the image in the training data. In another example, the grip layout prediction procedure may select aspects of the grip layout based on an augmented reality procedure, where a series of images are captured as the customer moves their hand, a hand size is determined based on a model identifying a hand landmark or a customer selecting the hand landmark, and the determined hand size is used to generate a sensor size, a sensor location, or a backstrap size as output.

The grip layout prediction procedure may take into account a difference in length of the third digit (e.g., the middle finger) and the second digit (e.g., the index finger) of the hand when determining a grip layout. For example, when the difference in length of the third digit and the second digit, or a ratio of the length of the third digit and the length of the second digit, is within a predetermined range, the grip layout prediction procedure may identify a grip layout based on the size of the hand, and when the difference or the ratio falls outside the range, the grip layout prediction procedure may identify a layout based on both the size of the hand and the difference or the ratio. A common finger size difference may be used to refer to a difference in length of the third digit and the second digit (or a ratio of the lengths) being within the predetermined range, and an uncommon finger size difference may be used to refer to a difference in length of the third digit and the second digit (or a ratio of the lengths) being outside the predetermined range. The size of the hand may be represented by the distance between the tip of the third digit and the base of the hand.

The grip layout prediction procedure may take into account handedness (e.g., a left-handed shooter or a right-handed shooter) when determining the grip layout. In some examples, the customer may provide user-input indicating a handedness, while in some other examples, the grip layout prediction procedure may predict a handedness based on the image depicting the hand. For example, a customer may provide user-input by selecting a handedness from a drop-down menu within an application (e.g., a mobile application, a web application, etc.), or the grip layout prediction procedure may predict a handedness based on the image depicting the hand and a model (e.g., a convolutional neural network) producing a handedness prediction as output. The model may be trained with training images depicting hands, where each training image is associated with a label indicating a known handedness of the hand depicted in the respective training image.

The customer may provide user-input in addition to, or instead of, the user-input indicating a handedness. For example, the customer may enter a number of users authorized to operate the gun, or the customer may provide an annotation of an image (e.g., an annotation drawing a line from the base of the hand to the tip of the third digit), and the grip layout prediction procedure may predict the grip layout based on the user-input. A grip layout prediction procedure may generate a grip layout or an output for use in determining a grip layout. A grip layout may include a sensor size, a sensor location, or a backstrap size, while an output for use in determining a grip layout may include a handedness, a hand size, a ratio of the length of the second digit with respect to the length of the third digit, a sensor size, a sensor location, or a backstrap size. Examples of sensors that may be selected and/or positioned as part of a grip layout prediction procedure include fingerprint scanners, palmprint scanners, vein pattern scanners, cameras, laser proximity sensors, time-of-flight sensors, capacitive touch sensors, and the like.

Predicting a grip layout based on an image of a hand saves the customer time, as the customer can take the picture from the comfort of their home without having to physically handle multiple guns of different sizes to identify a preferred grip layout. Predicting a grip layout provides additional benefits in the context of guns that include embedded sensors, as the grip layout is important to facilitate the accurate and reliable functioning of the sensor. For example, some sensors may collect biometric data while other sensors may determine whether the hand of the customer is making contact with the gun in a particular location. Aspects of a grip layout may be used as part of a manufacturing process. For example, a gun may be manufactured with a fingerprint scanner positioned on the gun at a location that is based on the handedness and the hand size of the customer such that the tip of the middle finger (e.g., the distal phalange of the third digit) of the customer naturally rests on the fingerprint scanner as the customer grasps the gun. Predicting a grip layout based on an image therefore improves manufacturing efficiency, customer experience, and the overall ergonomics of the gun.

Embodiments may be described in the context of executable instructions for the purpose of illustration. For example, a device may be described as being capable of executing instructions that facilitate a grip layout prediction procedure to support determining a grip layout and improve gun ergonomics. In some examples, the device may execute instructions so as to implement a grip layout manager. However, those skilled in the art will recognize that aspects of the technology could be implemented via hardware, firmware, or software.

Terminology

References in the present disclosure to "an embodiment" or "some embodiments" means that the feature, function, structure, or characteristic being described is included in at least one embodiment. Occurrences of such phrases do not necessarily refer to the same embodiment, nor do they necessarily refer to alternative embodiments that are mutually exclusive of one another.

Unless the context clearly requires otherwise, the terms "comprise," "comprising," and "comprised of" are to be construed in an inclusive sense rather than an exclusive or exhaustive sense (i.e., in the sense of "including but not limited to"). The term "based on" is also to be construed in an inclusive sense rather than an exclusive or exhaustive sense. For example, the phrase "A is based on B" does not imply that "A" is based solely on "B." Thus, the term "based on" is intended to mean "based at least in part on" unless otherwise noted.

The terms "connected," "coupled," and variants thereof are intended to include any connection or coupling between two or more elements, either direct or indirect. The connection or coupling can be physical, electrical, logical, or a combination thereof. For example, elements may be electrically or communicatively coupled with one another despite not sharing a physical connection. As one illustrative example, a first component is considered coupled with a second component when there is a conductive path between the first component and the second component. As another illustrative example, a first component is considered coupled with a second component when the first component and the second component are fastened, joined, attached, tethered, bonded, or otherwise linked.

The term "manager" may refer broadly to software, firmware, or hardware. Managers are typically functional components that generate one or more outputs based on one or more inputs. A computer program may include or utilize one or more managers. For example, a computer program may utilize multiple managers that are responsible for completing different tasks, or a computer program may utilize a single manager that is responsible for completing all tasks. As another example, a manager may include an electrical circuit that produces an output based on hardware components, such as transistors, logic gates, analog components, or digital components. Unless otherwise noted, the terms "manager" and "module" may be used interchangeably herein.

The term "landmark" may refer broadly to an anatomical feature that may be consistently present, and therefore provide an indication of position. Some landmarks may be visible to the human eye, while other landmarks may be largely or entirely invisible to the human eye. Examples of visible landmarks include the edges and tips of fingers, the base of the palm, and the joints in the hand. Examples of invisible landmarks include folks, creases, and lines along the inside of the hand (e.g., the fingers or palm), protrusions along the surface of the hand, blood vessels, and the like. Invisible landmarks may only be detectable through analysis of data output by certain types of sensors-such as image sensors that are sensitive to near infrared light, infrared light, or ultraviolet light, light detection and ranging sensors (also referred to as "LiDAR sensors"), and pressure sensors that are sensitive to contours and pressure points of the hand—that tend to be difficult to manipulate or trick.

When used in reference to a list of multiple items, the term "or" is intended to cover all of the following interpretations: any of the items in the list, all of the items in the list, and any combination of items in the list. For example, the list "A, B, or C" indicates the list "A" or "B" or "C" or "A and B" or "A and C" or "B and C" or "A and B and C."

Overview of Guns

FIG. 1 illustrates an example of a gun 100 including a grip layout. The grip layout of the gun 100 may be determined by a grip layout manager based on an image of a hand.

The gun 100 includes a trigger 105, a barrel 110, a magazine 115, and a magazine release 120. While these components are generally found in firearms, such as pistols, rifles, and shotguns, those skilled in the art will recognize that the technology described herein may be similarly applicable to other types of guns as discussed above. As an example, comparable components may be included in vehicle-mounted weapons that are not intended to be held or operated by hand. While not shown in FIG. 1, the gun 100 may also include a striker (e.g., a ratcheting striker or rotating striker) or a hammer that can be actuated in response to pulling the trigger 105. Pulling the trigger 105 may result in the release of the striker or hammer, thereby causing the striker or hammer to contact a firing pin, percussion cap, or primer, so as to ignite a propellant and fire a projectile through the barrel 110. Embodiments of the gun 100 may also include a blowback system, a locked breech system, or any combination thereof. These systems are more commonly found in self-reloading firearms. The blowback system may be responsible for obtaining energy from the motion of the case of the projectile as it is pushed to the rear of the gun 100 by expanding propellant, while the locked breech system may be responsible for slowing down the opening of the breech of a self-reloading firearm when fired. Accordingly, the gun 100 may support the semi-automatic firing of projectiles, the automatic firing of projectiles, or both.

The gun 100 may include one or more safeties that are meant to reduce the likelihood of an accidental discharge or an unauthorized use. The gun 100 may include one or more mechanical safeties, such as a trigger safety or a firing pin safety. The trigger safety may be incorporated in the trigger 105 to prevent the trigger 105 from moving in response to lateral forces placed on the trigger 105 or dropping the gun. The term "lateral forces," as used herein, may refer to a force that is substantially orthogonal to a central axis 145 that extends along the barrel 110 from the front to the rear of the gun 100. The firing pin safety may block the displacement path of the firing pin until the trigger 105 is pulled. Additionally or alternatively, the gun 100 may include one or more electronic safety components, such as an electronically actuated drop safety. In some cases, the gun 100 may include both mechanical and electronic safeties to reduce the potential for an accidental discharge and enhance the overall safety of the gun 100.

The gun 100 may include one or more sensors, such as a user presence sensor 125 and a biometric sensor 140. In some cases, the gun 100 may include multiple user presence sensors 125 whose outputs can collectively be used to detect the presence of a user. For example, the gun 100 may include a time of flight (TOF) sensor, a photoelectric sensor, a capacitive sensor, an inductive sensor, a force sensor, a resistive sensor, or a mechanical switch. As another example, the gun 100 may include a proximity sensor that is configured to emit an electromagnetic field or electromagnetic radiation, like infrared, and looks for changes in the field or return signal. As another example, the gun 100 may include an inertial measurement unit (IMU) configured to identify a presence event in response to measuring movement that matches a movement signature of a user picking up the gun 100. As another example, the gun 100 may include an audio input mechanism (e.g., a transducer implemented in a microphone) that is configured to generate a signal that is representative of nearby sounds, and the presence of the user can be detected based on an analysis of the signal.

The gun 100 may also include one or more biometric sensors 140 as shown in FIG. 1. For example, the gun 100 may include a fingerprint scanner (also referred to as a "fingerprint scanner"), an image sensor, or an audio input mechanism. The fingerprint scanner may generate a digital image (or simply "image") of the fingerprint pattern of the user, and the fingerprint pattern can be examined (e.g., on the gun 100 or elsewhere) to determine whether the user should be verified. The image sensor may generate an image of an anatomical feature (e.g., the face or eye) of the user, and the image can be examined (e.g., on the gun 100 or elsewhere) to determine whether the user should be verified. Normally, the image sensor is a charge-coupled device (CCD) or complementary metal-oxide semiconductor (CMOS) sensor that is included in a camera module (or simply "camera") able to generate color images. The image sensor need not necessarily generate images in color, however. In some embodiments, the image sensor is configured to generate ultraviolet, infrared, or near infrared images. Regardless of its nature, images generated by the image sensor can be used to authenticate the presence or identity of the user. As an example, an image generated by a camera may be used to perform facial recognition of the user. The audio input mechanism may generate a signal that is representative of audio containing the voice of the user, and the signal can be examined (e.g., on the gun 100 or elsewhere) to determine whether the user should be verified. Thus, the signal generated by the audio input mechanism may be used to perform speaker recognition of the user. Including multiple biometric sensors in the gun 100 may support a robust authentication procedure that functions in the event of sensor failure, thereby improving gun reliability. Note, however, that each of the multiple biometric sensors may not provide the same degree or confidence of identity verification. As an example, the output produced by one biometric sensor (e.g., an audio input mechanism) may be used to determine whether a user is present while the output produced by another biometric sensor (e.g., a fingerprint scanner or image sensor) may be used to verify the identity of the user in response to a determination that the user is present.

The gun 100 may include one or more components that facilitate the collection and processing of token data. For example, the gun 100 may include an integrated circuit (also referred to as a "chip") that facilitates wireless communication. The chip may be capable of receiving a digital identifier, such as a Bluetooth® token or a Near Field Communication (NFC) identifier. The term "authentication data" may be used to describe data that is used to authenticate a user. For example, the gun 100 may collect authentication data from the user to determine that the user is authorized to operate the gun 100, and the gun 100 may be unlocked in based on determining that the user is authorized to operate the gun 100. Authentication data may include biometric data, token data, or both. Authentication data may be referred to as enrollment data when used to enroll a user, and authentication data may be referred to as query data when used to authenticate a user. In some examples, the gun may transform (e.g., encrypt, hash, transform, encode, etc.) enrollment data and store the transformed enrollment data in memory (e.g., non-volatile memory) of the gun, and the gun may discard or refrain from storing query data in the memory. Thus, the gun 100 may transform authentication data, so as to inhibit unauthenticated use even in the event of unauthorized access of the gun.

The gun 100 may support various types of aiming sights (or simply "sights"). At a high level, a sight is an aiming device that may be used to assist in visually aligning the gun 100 (and, more specifically, its barrel 110) with a target. For example, the gun 100 may include iron sights that improve aim without the use of optics. Additionally or alternatively, the gun 100 may include telescopic sights, reflex sights, or laser sights. In FIG. 1, the gun 100 includes two sights-namely, a front sight 130 and a rear sight 135. In some cases, the front sight 130 or the rear sight 135 may be used to indicate gun state information. For example, the front sight 130 may include a single illuminant that is able to emit light of different colors to indicate different gun states. As another example, the front sight 130 may include multiple illuminants, each of which is able to emit light of a different color, that collectively are able to indicate different gun states. One example of an illuminant is a light-emitting diode (LED).

The gun 100 may fire projectiles, and the projectiles may be associated with lethal force or less-lethal force. For example, the gun 100 may fire projectiles containing lead, brass, copper, zinc, steel, plastic, rubber, synthetic polymers (e.g., nylon), or a combination thereof. In some examples, the gun 100 is configured to fire lethal bullets containing lead, while in other cases the gun 100 is configured to fire less-lethal bullets containing rubber. As mentioned above, the technology described herein may also be used in the context of a gun that fires prongs (also referred to as "darts") which are intended to contact or puncture the skin of a target and then carry electric current into the body of the target. These guns are commonly referred to as "electronic control weapons" or "electroshock weapons." One example of an electroshock weapon is a TASER device.

The grip layout of the gun 100 may be determined based on a grip layout prediction procedure. A grip layout manager may perform a grip layout prediction procedure. For example, a grip layout manager may receive an image depicting a representation of a hand and a fiducial marker indicating a scale, calculate, based on the fiducial marker indicating the scale, a distance between a first landmark of the hand and a second landmark of the hand, determine that the calculated distance between the first landmark of the hand and the second landmark of the hand satisfies a size threshold, and determine a location on the gun 100 for the biometric sensor 140 based on the determining that the size threshold is satisfied. The grip layout manager may be implemented by a processor, a computer, a server, a smartphone, or the like.

As another example, a grip layout manager may obtain an image depicting a hand, obtain calibration data associated with the image, calculate a real distance between a first landmark of the hand and a second landmark of the hand, and determine a grip layout for the gun based on the real distance between the first landmark and the second landmark. Calibration data may include a scale for the image or data that may be used to derive the scale, such as an object of known dimensions, an angular field of view, or a distance between the device used to capture the image and the hand. The first landmark may represent the tip of the third digit of the hand (e.g., the distal end of the middle finger) and the second landmark may represent a base of the hand (e.g., where the wrist meets the hand). The grip layout may include a backstrap size, a sensor size, or a sensor location on the gun 100. A backstrap is the rearmost portion of the grip of the gun 100, and the backstrap is generally designed to contact the palm of the primary hand grasping the gun 100.

Figure 2:
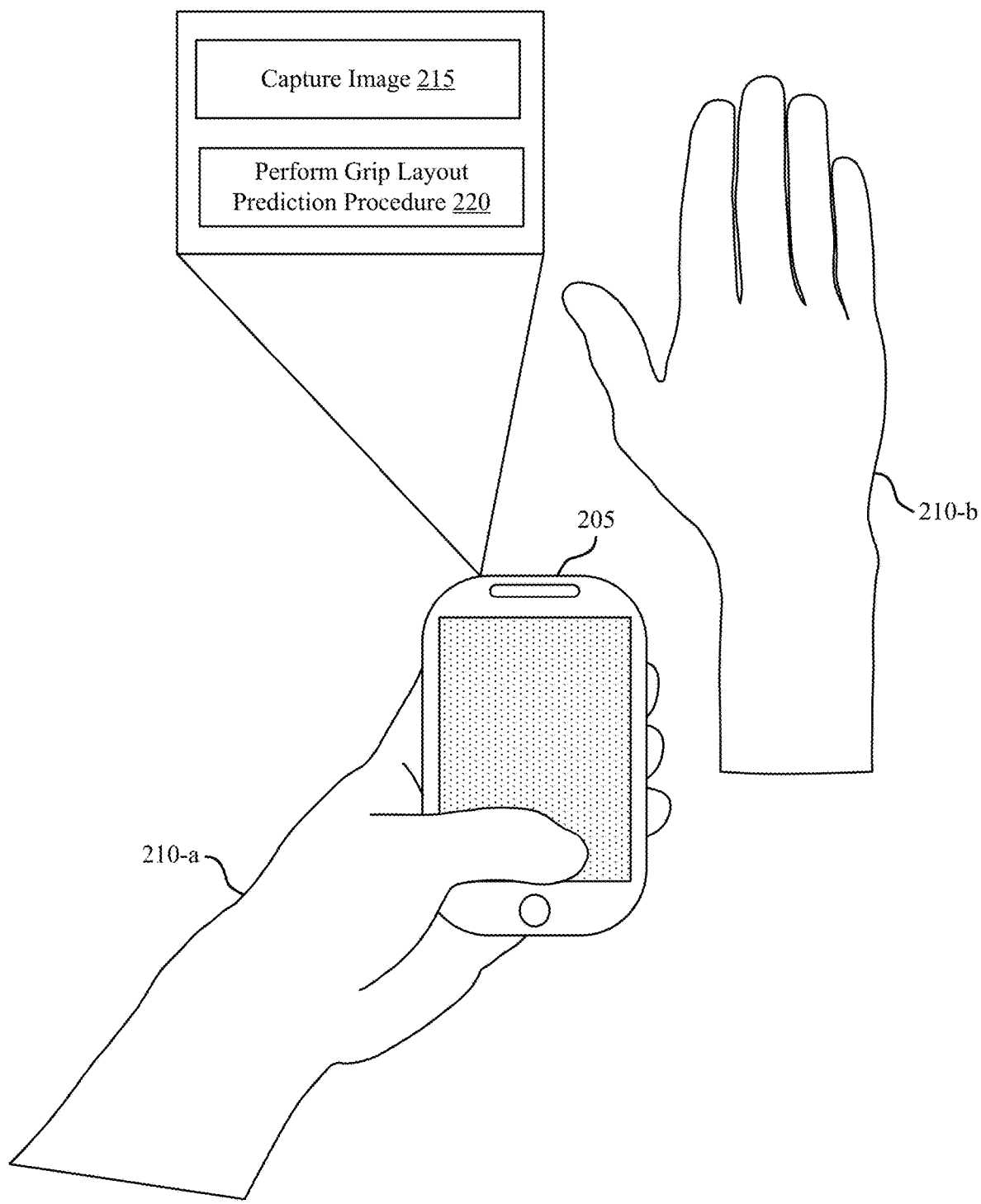
FIG. 2 illustrates an example of a customer capturing an image for use in a grip layout prediction procedure.

FIG. 2 illustrates an example of a customer capturing an image of the hand 210-b for use in a grip layout prediction procedure. The hand 210-a and the hand 210-b represent hands of a customer that has purchased, or is shopping for, a gun. The customer is holding a device 205 (e.g., a user device, a smartphone, a tablet, a camera, etc.) with the hand 210-a, and the customer is capturing an image of the hand 210-b with the device 205. FIG. 2 illustrates a customer capturing an image of their right hand, but it should be understood that the customer may instead capture an image of their left hand, or an individual (e.g., a representative, a salesperson, etc.) may capture an image of either or both hands of the customer. As described herein, a grip layout may be determined based on an image depicting a hand.

At step 215, the customer captures an image depicting the hand 210-b. The customer may capture the image depicting the hand 210-b and submit the image to a gun manufacturer via mail, email, a web form, or the like. In some examples, the customer may be prompted to capture the image by an application (e.g., a web application or a mobile application), and the application may facilitate the transmission of the image to a database. In some examples, the image may be stored at the device 205, while in some other examples, the image may be stored at a data center.

In some examples, the customer may choose which hand to take a picture of based on the handedness of the customer. The handedness of the customer represents the dominant or preferred shooting hand, and the handedness of the customer may be determined based on the hand depicted in the image. As an illustrative example, the customer represented in FIG. 2 may be a right-handed person since the customer is capturing an image of the hand 210-b, which is a right hand.

The hand depicted in the image may be identified as a left hand or a right hand based on the location of the first digit relative to the location of an additional digit (e.g., the second digit, the third digit, the fourth digit, or the fifth digit), and the handedness of the customer may be determined based on whether the hand depicted in the image is a right hand or a left hand. As another example, the handedness of the customer may be determined based on user-input provided by the customer indicating whether the customer is right-handed or left-handed. In some examples, an ambidextrous grip layout may be determined based on the image captured at step 215, while in some other examples, a non-ambidextrous grip layout may be determined based on the image captured at step 215.

At step 220, a grip layout prediction procedure may be performed to determine a grip layout. The grip layout prediction procedure may be performed by the device 205 or by a data center, such as a cloud-based data center. The grip layout prediction procedure may determine the grip layout based on the image captured at step 215. The grip layout prediction procedure may identify landmarks of the hand 210-b, determine a handedness, determine a hand size, determine a ratio of finger lengths, determine a sensor location, determine a sensor size, determine a backstrap size, or any combination thereof. In some examples, the customer may provide user-input, such as an indication of handedness or the number of users permitted to operate the gun. The grip layout prediction procedure may determine a grip layout based on the user-input, the image, and calibration data associated with the image. Calibration data may be used in identifying landmarks and/or determining the size of the hand depicted in the image. For example, calibration data may include a fiducial marker or an indication of the distance between the image capturing device and the hand at the point in time at which the image was captured. The calibration data may be used to convert the in-image size of the hand to the real size of the hand, and the real size of the hand may be used to determine the grip layout. The grip layout prediction procedure is further discussed herein, such as with reference to FIGS. 4 and 5.

Figure 3:
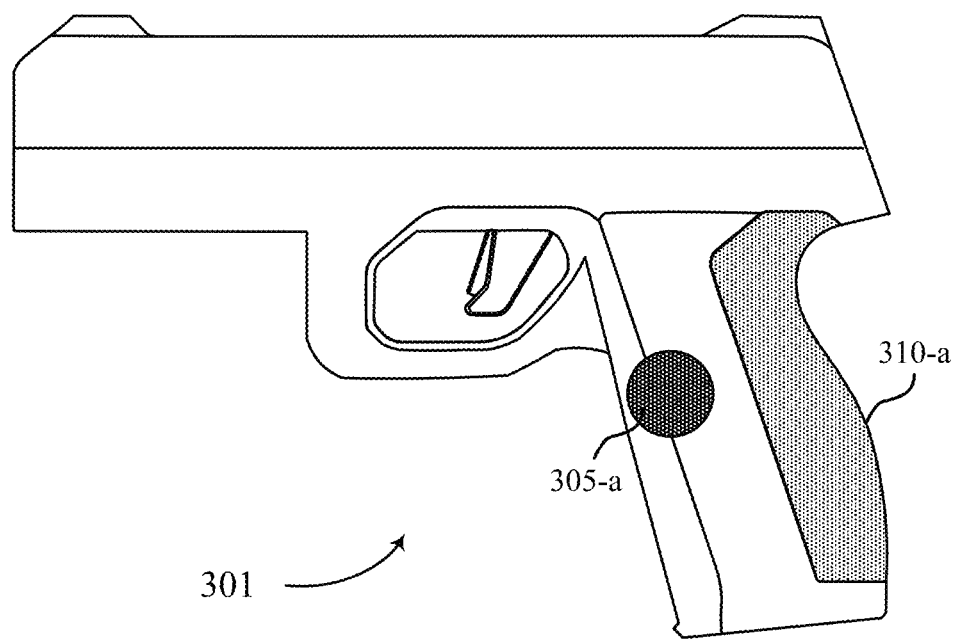
FIG. 3 illustrates examples of guns that can be configured with a grip layout for a customer.
Figure 3:
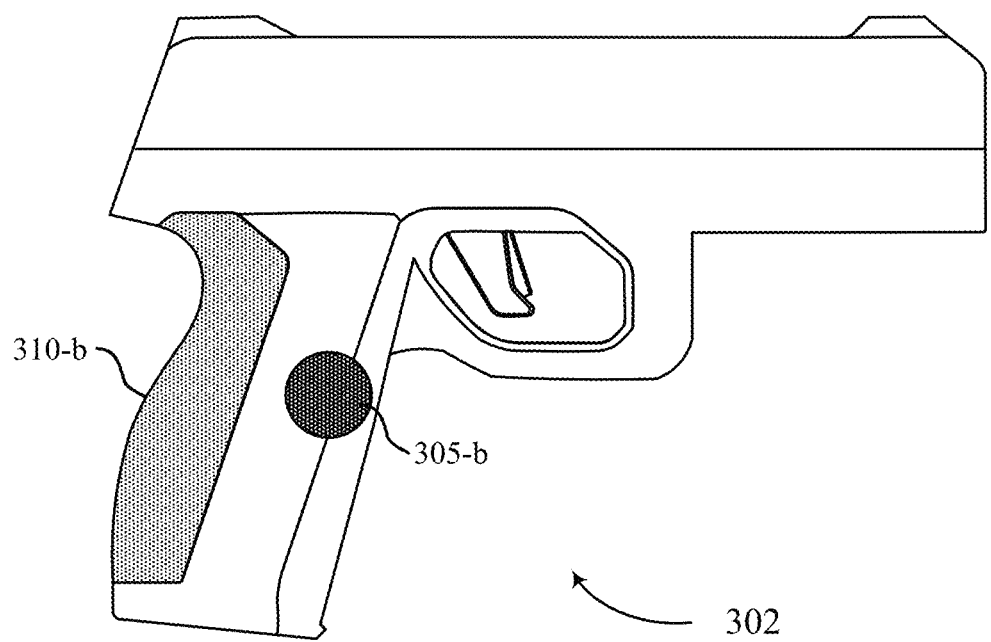

FIG. 3 illustrates an example of a gun 301 and a gun 302 that can be configured with a grip layout for a customer. The gun 301 and the gun 302 may be examples of the gun described with reference to FIG. 1.

As an example, an ambidextrous gun may include a biometric sensor on both the left side of the grip and the right side of the grip, and the gun 301 may represent a left-side view of the ambidextrous gun while the gun 302 may represent a right-side view of the ambidextrous gun. As another example, a non-ambidextrous gun may include a biometric sensor on the left side of the grip, and the gun 301 may represent a left-side view of the non-ambidextrous gun. The gun 301 illustrates an example of a grip layout for a customer that is right-handed (e.g., a handedness that is right-hand dominant or preferred). As yet another example, a non-ambidextrous gun may include a biometric sensor on the right side of the grip, and the gun 302 may represent a right-side view of the non-ambidextrous gun. The gun 302 illustrates an example of a grip layout for a customer that is left-handed (e.g., a handedness that is left-hand dominant or preferred).

The gun 301 includes a sensor 305-a (e.g., a fingerprint scanner, a vein pattern scanner, a heartbeat reader, a radio-frequency identification (RFID) reader, an NFC reader, etc.) and a backstrap 310-a. The location of the sensor 305-a, the size of the sensor 305-a, the location of the backstrap 310-a, or the size of the backstrap 310-a may be determined as part of a grip layout prediction procedure described herein.

The gun 302 includes a sensor 305-b (e.g., a fingerprint scanner, a vein pattern scanner, a heartbeat reader, an RFID reader, an NFC reader, etc.) and a backstrap 310-b. The location of the sensor 305-b, the size of the sensor 305-b, the location of the backstrap 310-b, or the size of the backstrap 310-b may be determined as part of a grip layout prediction procedure described herein. Aspects of the grip layout may be selected such that the third digit of the hand of the customer rests on the fingerprint scanner of the gun as the customer grasps the gun. For example, the size of the backstrap may be selected such that the third digit of the hand of the customer rests on the fingerprint scanner of the gun as the customer grasps the gun.

Figure 4:
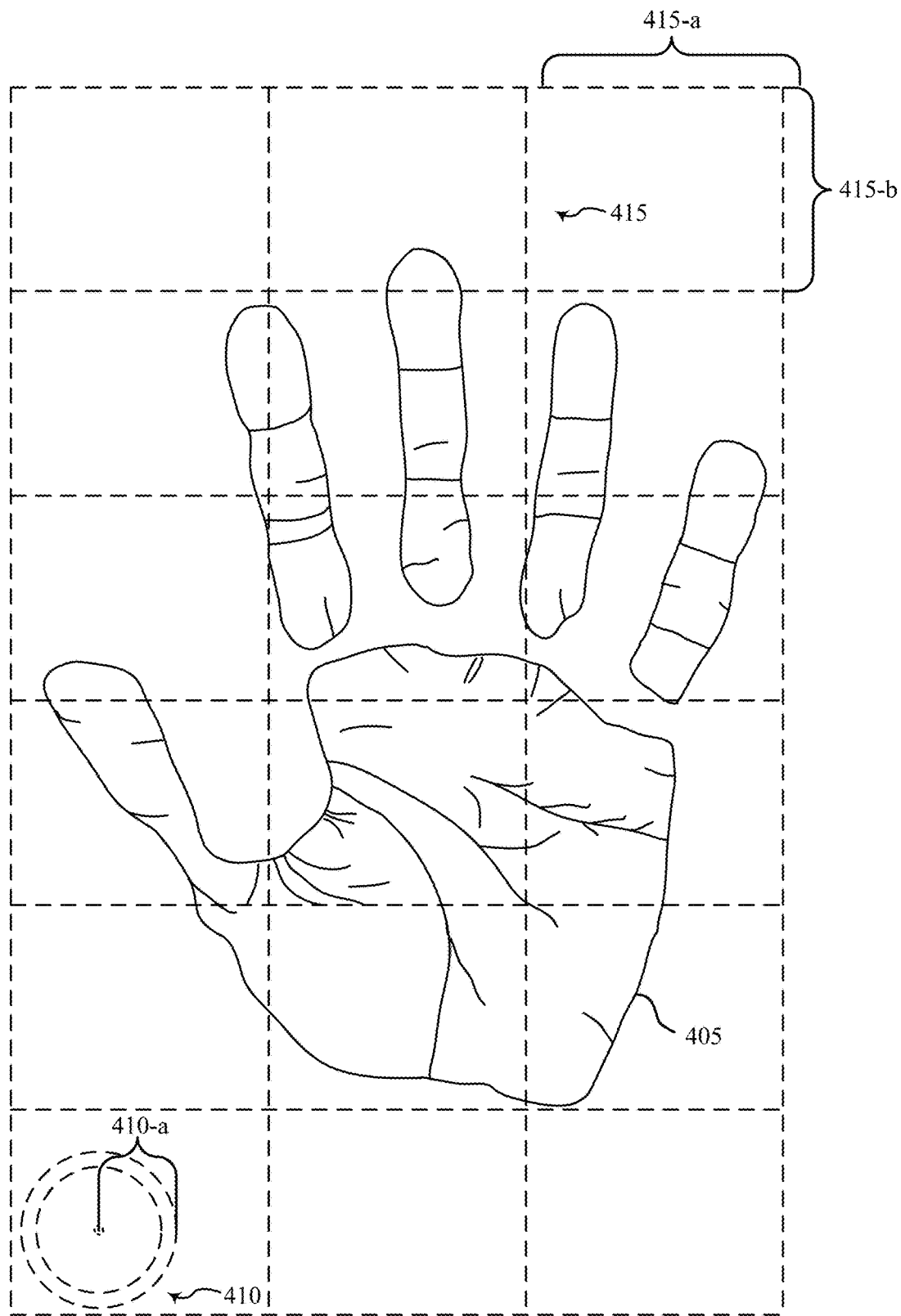
FIG. 4 illustrates an example of an image that can be used to determine a grip layout for a gun.

FIG. 4 illustrates an example of an image 400 that can be used to determine a grip layout for a gun. The image 400 depicts a hand 405, and the image 400 may be used in a grip layout prediction procedure. The hand 405 may be an actual hand of a customer, or the hand 405 may be a profile of the hand of the customer, such as an ink profile of the hand produced by the customer spreading ink on their hand and transferring the ink from their hand to a piece of paper or a heat-activated profile produced by the customer holding their hand on a thermally responsive material such that the material is altered to represent the hand. In other words, the hand 405 may represent a three-dimensional hand, or the hand 405 may represent a two-dimensional profile of a hand.

A layout prediction procure may generate a grip layout based on the image 400. The image 400 may include or be otherwise associated with calibration data. For example, the image 400 may be associated with metadata containing calibration data, and the calibration data may be used to determine the size of the actual hand that the hand 405 represents. The in-image size of the hand 405 may be determined based on the distance between the tip of the third digit of the hand 405 and the base of the hand 405, and the in-image size of the hand 405 may be converted to the real size of the hand 405 based on the calibration data indicating a scale of the image 400.

Calibration data may include a fiducial marker, an indication of the distance between the image capturing device (e.g., a user device, a mobile phone, a computer, etc.) and the object depicted in the image, an angular field of view of the image capturing device, or any combination thereof. An illustrative example of a fiducial marker is the marker 410, an illustrative example of an indication of the distance between the image capturing device and the object depicted in the image is the distance 515-x, and an illustrative example of an angular field of view of the image capturing device is the angular field of view 530-Ø.

Calibration data may be used to determine a scale, determine the real size of the hand that is represented by the hand 405, or determine the real size of aspects of the hand that is represented by the hand 405. An image capturing device may correspond to a user equipment, a smartphone, a tablet, a camera, or the like.

The marker 410 and the grid lines 415 are illustrative examples of fiducial markers. The dimensions of the marker 410 may be known and used as part of the grip layout prediction procedure to determine a scale, such as a pixels per metric ratio. For example, the radius 410-a of the marker 410 may be of known size (e.g., 2 centimeters), and the marker 410 may be used to calculate a pixels per metric ratio. The dimensions of the grid lines 415 (e.g., the width 415-a and the height 415-b) may be known and used as part of the grip layout prediction procedure to determine a scale, such as a pixels per metric ratio.

A pixels per metric ratio may be used to determine the real size of the hand represented by the hand 405 and/or aspects of the hand represented by the hand 405. The pixels per metric ratio may be used to convert the in-image size of the hand 405 to the real size of the hand 405. A pixels per metric ratio may be defined as $$\frac{\text{observed fiducial size}}{\text{known fiducial size}},$$

and the observed size of the region of interest (e.g., the region between two landmarks, the region between the tip of the third digit and the base of the hand, etc.) may be divided by the pixels per metric ratio to yield the real size of the region of interest that is represented in the image. In other words, the observed pixel count of the hand (e.g., the number of pixels between the tip of the third digit and the base of the hand) may be divided by the pixels per metric ratio to yield the actual size of the hand in reality. As an illustrative example, assume the in-image size (the size observed in the image) of the radius 410-*a* is 300 pixels and the real size (the actual size in reality) of the radius 410-*a* is 2 centimeters. In this illustrative example, the pixels per metric ratio is $$\frac{300 \text{ pixels}}{2 \text{ centimeters}},$$

meaning 150 pixels in the image corresponds to 1 centimeter on the actual object that is depicted in the image. If the observed size of the hand 405 (e.g., the distance between the tip of the third digit and the base of the hand) is 2200 pixels, then the actual size of the hand is $$14\frac{2}{3}$$

centimeters, since $$\frac{2200}{\left(\frac{300}{2}\right)} = 14\frac{2}{3}.$$

A fiducial marker may be positioned near the hand of the customer (or a profile of the hand) such that both the hand and the fiducial marker are included in the image, or a fiducial marker may be part of the lens of the image capturing device such that the fiducial marker is included in images captured by the image capturing device. As an example, a customer may place his or her hand on a piece of paper that contains a thermally reactive substance and a fiducial marker. The thermally reactive substance may react to the heat of the hand and change color such that a profile of the hand of the customer is left on the paper after the hand is removed. The customer may then take a picture of the piece of paper, capturing both the profile of the hand and the fiducial marker, and the picture may be used as part of a grip layout prediction procedure to determine a grip layout. The picture may be taken in response to a prompt (e.g., a popup or text suggestion) generated by an application (e.g., mobile application or a web application). A profile of a hand may alternatively include an ink profile of the hand or a traced outline of the hand.

Figure 5:
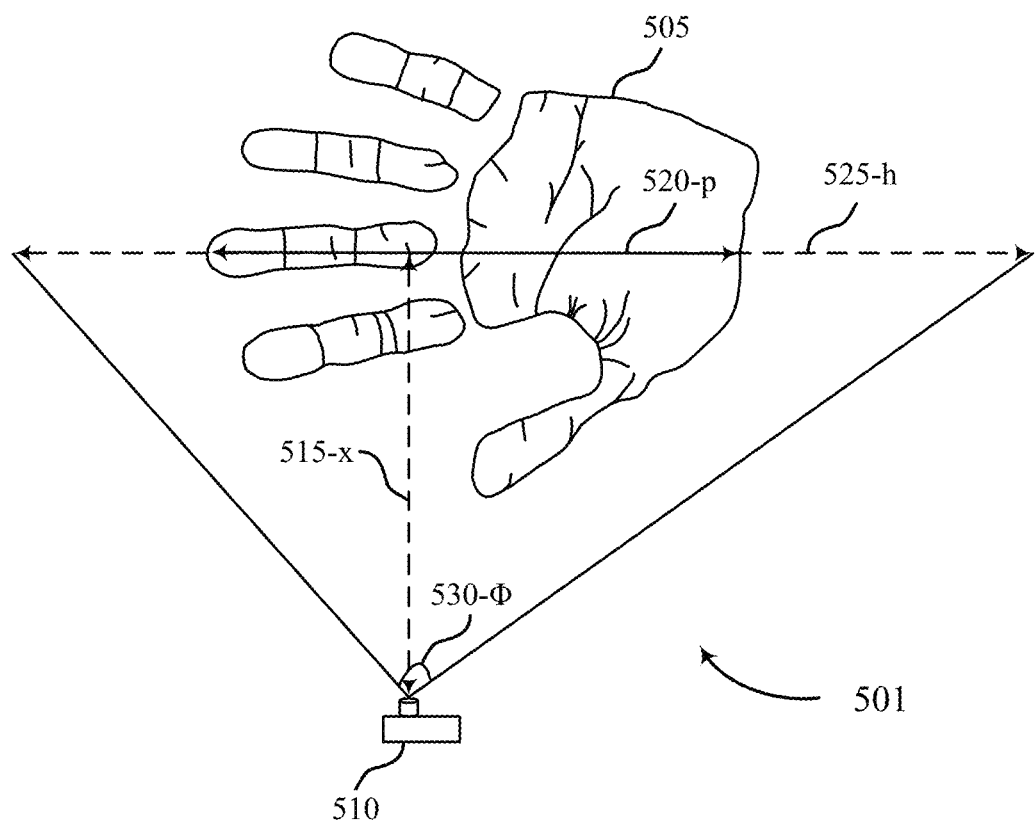
FIG. 5 illustrates an example of a hand in reality and an example of an image depicting the hand.
Figure 5:
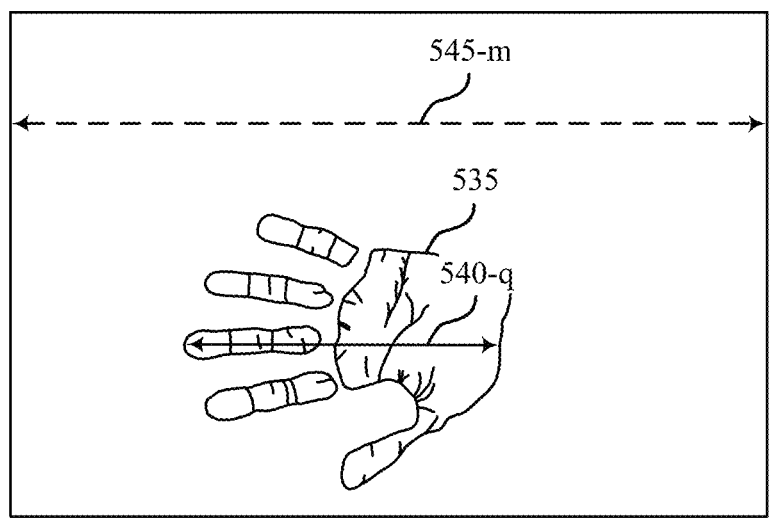

FIG. 5 illustrates an example of reality 501 and an example of an image 502. Reality 501 includes a hand 505, and the image 502 includes a depiction 535 of the hand 505. As part of a grip layout prediction procedure, the size of the hand 505 may be determined based on the image 502 and the distance between the device 510 (e.g., an image capturing device, such as a user equipment, a smartphone, a camera, etc.) and the hand 505 (e.g., the object being captured in the image). The distance 515-*x* between the device 510 and the hand 505 is an example of calibration data. A grip layout prediction procedure may convert the size of the depiction 535 to the size of the hand 505, and the size of the hand 505 may be used to select aspects of a grip layout, such as a backstrap size, a sensor size, a sensor location, or the like.

The hand 505 may be a two-dimensional profile, or the hand 505 may be a three-dimensional hand, such as a bare hand or a gloved hand. In other words, the device 510 may capture an image of an actual hand or a profile of a hand. In some examples, the hand 505 may include landmark markers, such as a piece of tape marking the tip of the third digit and a piece of tape marking the base of the hand. The depiction 535 may be an image, a portion of an image, a group of pixels in an image, or the like. For example, the depiction 535 may be a group of pixels identified as part of a segmentation procedure. The size of the depiction 535 may be represented by the length 540-*q*, and the size of the hand 505 may be represented by the length 520-*p*.

The distance 515-*x*, which indicates the distance between the device 510 and the hand 505, may be received (e.g., as user-input), measured (e.g., by an ultrasonic sensor or LiDAR), or derived (e.g., based on an object of known size in the image), and the distance 515-*x* may be used to determine the real size of the hand represented in the image 502. For example, the distance 515-*x* may be measured manually (e.g., with a tape measure), measured automatically (e.g., with a rangefinder, time of flight sensor, ultrasonic sensor, etc.), or calculated based on a fiducial marker or an object of known size present in the image. The distance 515-*x* may be used to convert the length 540-*q* in the image 502 to the length 520-*p* in reality 501.

The length 520-*p* of the hand 505 in reality 501 may be referred to as "p," the viewing length 525-*h* in reality 501 may be referred to as "h," the length 540-*q* of the depiction 535 in the image 502 may be referred to as "q," and the length 545-*m* of the image 502 may be referred to as "m." The goal in this illustrative example is to find the value of "p," which corresponds to the size of the hand 505 in reality 501. The value of "p" can be determined based on the image 502 and the distance 515-*x* (referred to as "x"), and the value of "p" may be used to select a grip layout.

We know $$\frac{q}{m} = \frac{p}{h}$$

since the ratio of the length "q" and the length "m" in the image 502 is the same as the ratio of the length "p" and the length "h" in reality 501. As such, we known that $$p = \frac{hq}{m}.$$

The value of "q" and the value of "m" can be calculated based on the image (e.g., counting the number of pixels covered by "q" and "m," respectively), and the value of h can be calculated based on the value of "x" and the value of "Φ" (the angular field of view 530-Φ of the device 510). The value of "Φ" can be measured or looked-up for the device 510. Thus, we can calculate the value of "p" based on the distance "x" and some trigonometry. For a right triangle, $$\tan(\Phi) = \frac{\text{opposite}}{\text{adjacent}},$$

so $$\tan\left(\frac{\Phi}{2}\right) = \frac{\frac{h}{2}}{x}, x\tan\left(\frac{\Phi}{2}\right) = \frac{h}{2}, \text{ and } 2x\tan\left(\frac{\Phi}{2}\right) = h.$$

Now we can substitute "h" into $$p = \frac{hq}{m}$$

and we get $$p = \frac{2x\tan\left(\frac{\Phi}{2}\right)q}{m}.$$

We now have formula (which may be referred to as a "known distance formula") to find the length "p" of the hand 505 in reality 501 based on the image 502.

Figure 6:
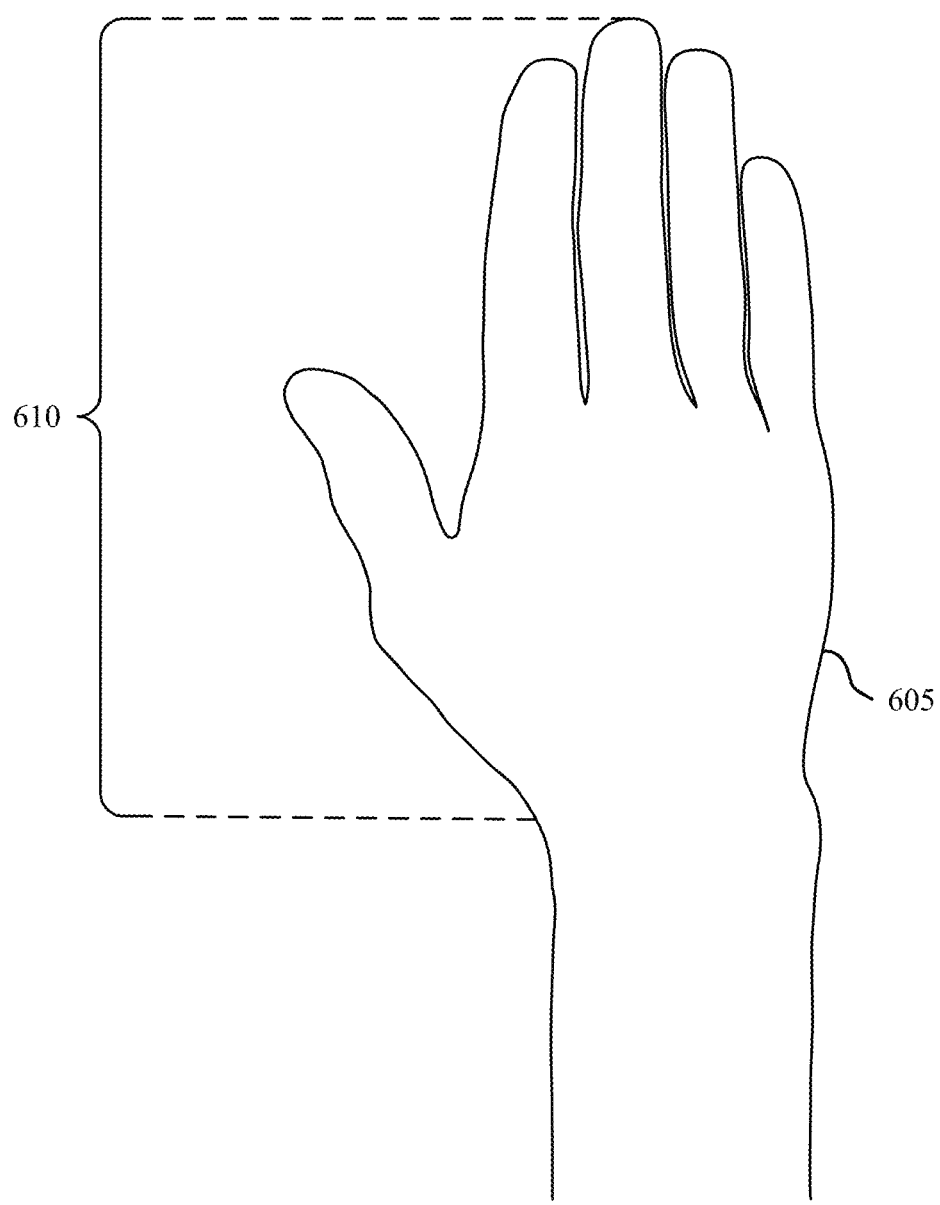
FIG. 6 illustrates an example measurement of a hand that can be used to represent the size of the hand.

FIG. 6 illustrates an example of a measurement of a hand 605 that can be used to represent the size of the hand 605. The hand 605 is an example of a hand of a customer, and a grip layout may be determined based on the morphometric properties of the hand 605. A device may capture an image of the hand 605 or a profile of the hand 605, and the image may be used to determine a grip layout.

The size of the hand 605 may be represented by the length 610. The length 610 indicates the distance between the tip of the third digit of the hand 605 and the base of the hand 605. In some examples, the tip of the third digit may be a landmark identified by a machine learning model, and the base of the hand may be another landmark identified by a machine learning model. The length 610 may be measured in various units, such as millimeters, centimeters, inches, or the like.

A grip layout may be determined based on a size threshold, a decision tree, or a machine learning model, such as a random forest, an artificial neural network, a convolutional neural network, or the like. For example, as part of the grip layout prediction procedure, it may be determined that the length 610 satisfies a size threshold, and a grip layout may be selected based on the size threshold being satisfied. As an illustrative example, the size threshold may be a length of 20 centimeters, and the size threshold may be satisfied based on the length 610 being less than the size threshold. In some examples, a forward sensor location may be selected based on the size threshold being satisfied. The backstrap size and/or the sensor size may be selected based on the size threshold being satisfied. The size threshold of 20 centimeters is an illustrative example and it should be understood that other size thresholds may be used, such as 15 centimeters, 25 centimeters, or anywhere in between.

Figure 7:
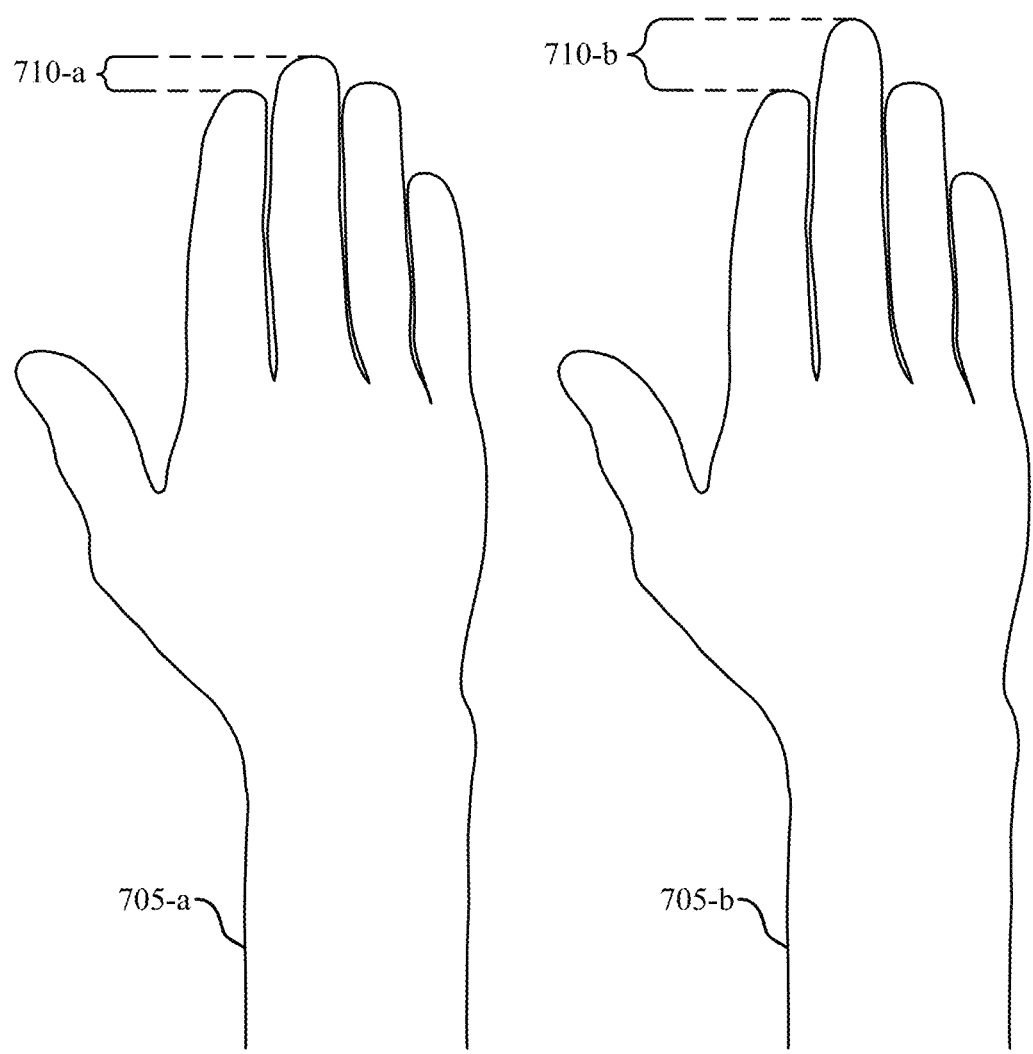
FIG. 7 illustrates an example of a hand with a common finger size difference and an example of a hand with an uncommon finger size difference.

FIG. 7 illustrates an example of a hand 705-*a* with a common finger size difference and an example of a hand 705-*b* with an uncommon finger size difference. The difference 710-*a* may satisfy a common finger size difference threshold, and the difference 710-*b* may satisfy an uncommon finger size difference threshold. For example, the difference 710-*a* may be identified as a common finger size difference based on the difference 710-*a* being less than a threshold, and the difference 710-*b* may be identified as an uncommon finger size difference based on the difference 710-*b* being greater than the threshold.

As part of a grip layout prediction procedure, a difference in the size of fingers (e.g., the difference 710-*a* or the difference 710-*b*) may be compared to a finger size difference threshold. The difference in fingers may be based on the distance between the tip of the third digit and the tip of the second digit, based on the difference in length of the third digit and the length of the second digit, or based on a ratio of the length of the third digit as compared to the length of the second digit. The length of a digit may be measured from the tip of the digit (e.g., a distal end of the digit) to the bottom crease of the digit, or from the tip of the digit to the base of the hand. The finger size difference threshold may be a length or a ratio. For example, the finger size difference threshold may be a length of 5 millimeters (mms), 15 mms, or anywhere in between, or the finger size difference threshold may be a ratio of 80 mm/100 mm, 95 mm/100 mm, or anywhere in between.

In some examples, the grip layout prediction procedure may determine that a finger size difference threshold is satisfied based on determining that a common finger size difference threshold is satisfied, or the grip layout prediction procedure may determine that a finger size difference threshold is satisfied beads on determining that an uncommon finger size difference threshold is satisfied. For example, the common finger size difference threshold may be satisfied based on a small difference between the length of the second digit as compared to the length of the third digit, and the uncommon finger size difference threshold may be satisfied based on a large difference between the length of the second digit as compared to the length of the third digit. In some cases, the grip layout prediction procedure may select a sensor location based on the common finger size difference threshold being satisfied, and the grip layout prediction procedure may select a sensor location as well as a backstrap size based on the uncommon finger size difference threshold being satisfied.

The difference 710-*a* of the hand 705-*a* satisfies a finger size difference threshold corresponding to a common finger size difference threshold. As an illustrative example, if the common finger size difference threshold is a distance of 10 mm and the length of the third digit is 80 mms, then a second digit of 75 mm satisfies the common finger size difference threshold since 75 mm is within 10 mm of 80 mm. As another illustrative example, if the common finger size difference threshold is a ratio of 90 mm/100 mm and the length of the third digit is 80 mms, then a second digit of 75 mm satisfies the common finger size difference threshold since 75 mm/80 mm is greater than 90 mm/100 mm.

The difference 710-*b* of the hand 705-*b* satisfies a finger size difference threshold corresponding to an uncommon finger size difference threshold. As an illustrative example, if the uncommon finger size difference threshold is a distance of 10 mm and the length of the third digit is 90 mms, then an index finger of 75 mm satisfies the uncommon finger size difference threshold since the difference between 75 mm and 90 mm is greater than 10 mm. As another illustrative example, if the uncommon finger size difference threshold is a ratio of 90 mm/100 mm and the length of the second digit as compared to the length of the third digit is 75 mm/90 mm, then the uncommon finger size difference threshold is satisfied since the ratio of 75 mm/90 mm is less than the finger size difference threshold of 90 mm/100 mm.

In some examples, a grip layout prediction procedure may determine a grip layout based on a difference (e.g., the difference 710-*a* or the difference 710-*b*) satisfying a finger size difference threshold. For example, the grip layout prediction procedure may determine a grip layout including a small backstrap size and a rearward sensor location based on the uncommon finger size difference threshold being satisfied. Selecting the small backstrap size and the rearward sensor location allows the second digit of the hand 705-*b* to reach and manipulate the trigger while naturally guiding the third digit (that is uncommonly long relative to the length of the second digit) onto the sensor.

Figure 8:
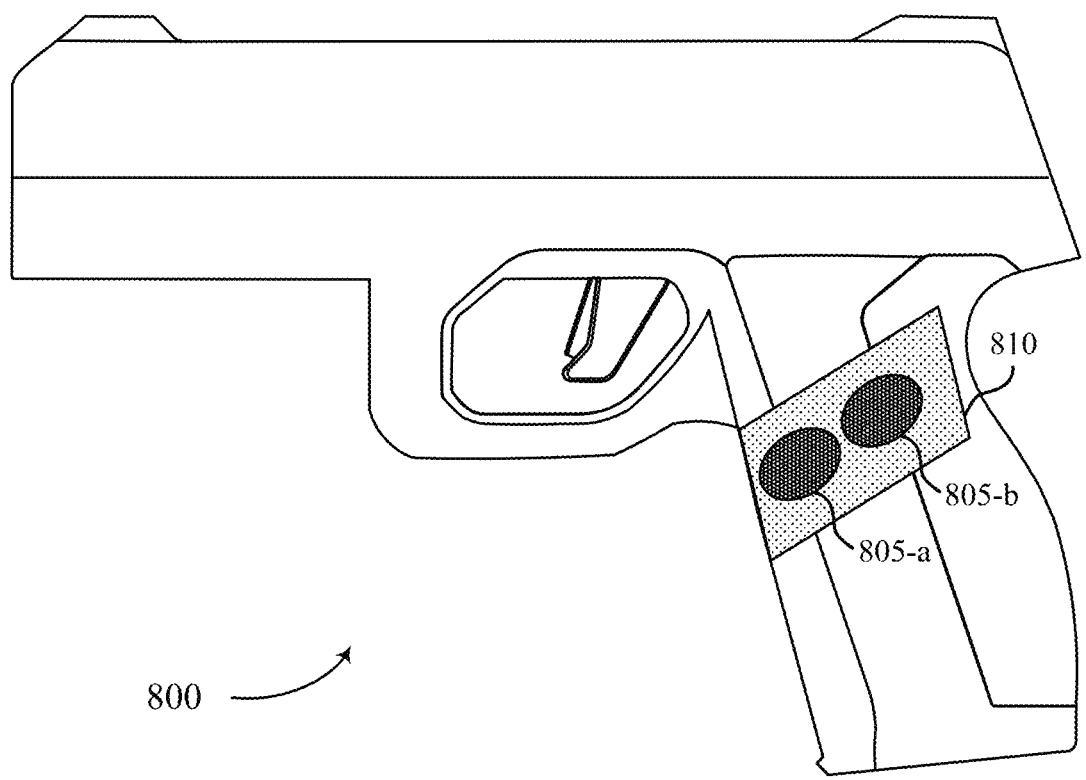
FIG. 8 illustrates an example of a gun showing potential sensor locations.

FIG. 8 illustrates an example of a gun 800 showing potential sensor locations. The gun 800 may be an example of the gun described with reference to FIG. 1.

The gun 800 includes a sensor 805-*a* in a sensor region 810 and a sensor 805-*b* in the sensor region 810. The sensor 805-*a* is in a forward sensor location, and the forward sensor location may be appropriate for a hand size satisfying a small size threshold. For example, if the size of the hand, as measured by the distance between the tip of the third digit and the base of the hand, is less than the small size threshold, the forward sensor location may be appropriate. A small size threshold may be 16 centimeters, 24 centimeters, or anywhere in between. In some cases, the small size threshold may be 20 centimeters.

The sensor 805-*b* is in a rearward sensor location. A rearward sensor location may be appropriate for a hand size satisfying a large size threshold. For example, if the size of a customer hand, as measured by the distance between the tip of the third digit and the base of the hand, is greater than a large size threshold, the large size threshold may be satisfied, and the rearward sensor location may be appropriate.

In some cases, a sensor may be in a middle sensor location. A middle sensor location may be appropriate for a hand size satisfying a medium threshold condition. A hand size may satisfy the medium threshold condition based on the hand size being greater than the small size threshold and smaller than the large size threshold. For example, if the size of a customer hand, as measured by the distance between the tip of the third digit and the base of the hand, is greater than the small size threshold and smaller than the large size threshold, the medium threshold condition may be satisfied, and the middle sensor location may be appropriate. The middle location may be between the forward sensor location illustrated by the sensor 805-*a* and the rearward sensor location illustrated by the sensor 805-*b*.

It should be understood that the sensor locations illustrated in FIG. 8 are illustrative examples, and that a sensor may be located anywhere in the sensor region 810, or anywhere on the gun 800. Additionally, the location of the sensor region 810 is an illustrative example, and the location of the sensor region 810 on the gun 800 may be modified, the shape of the sensor region 810 may be modified, and the number of sensor regions 810 on the gun 800 may be modified.

Figure 9:
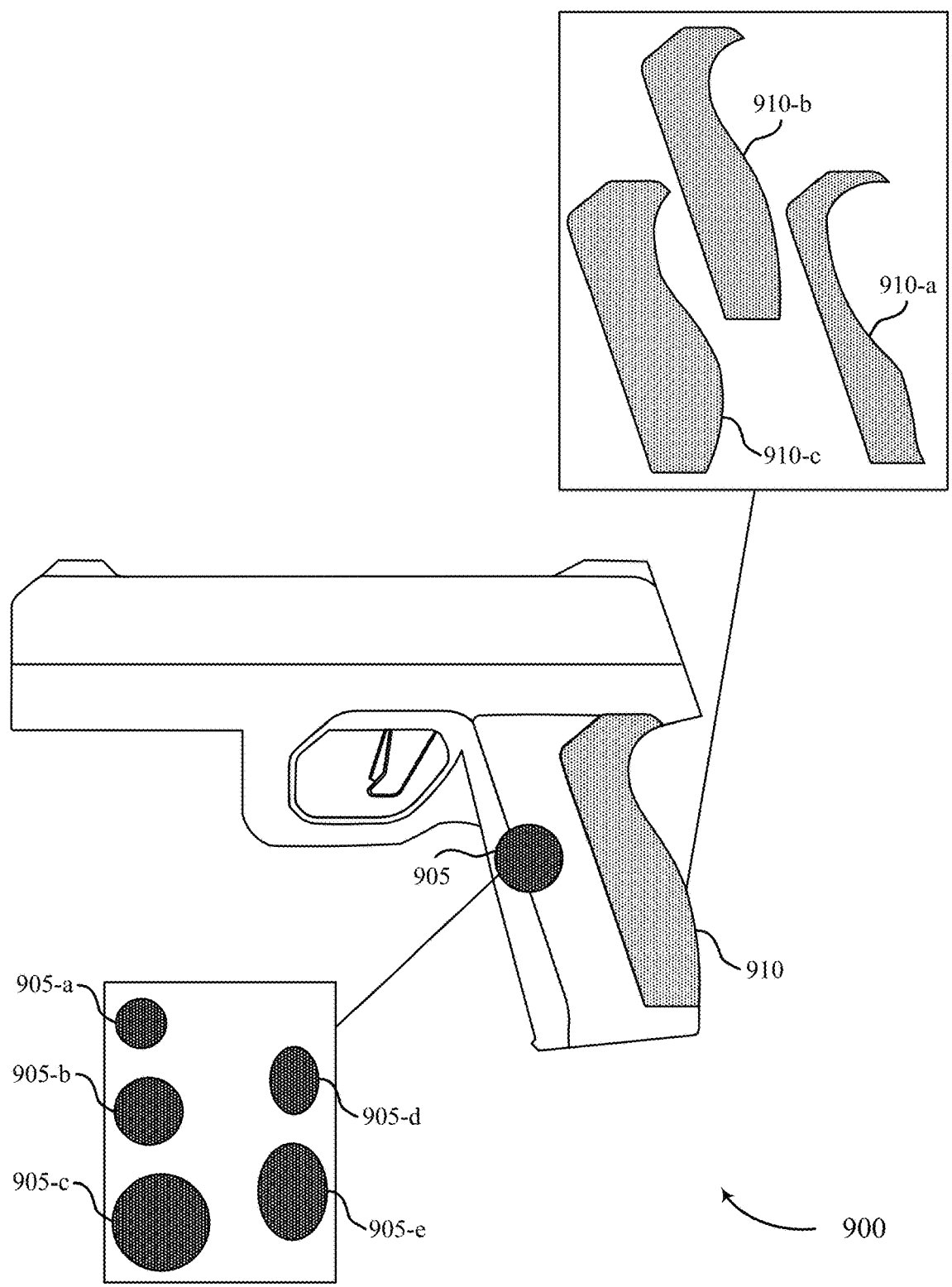
FIG. 9 illustrates an example of a gun showing potential sensor sizes and potential backstrap sizes.

FIG. 9 illustrates an example of a gun 900 showing potential sensor sizes and potential backstrap sizes. The gun 900 may be an example of the gun as described with reference to FIG. 1. The gun 900 includes a sensor 905 and a backstrap 910.

The sensor 905 may be an example of an authentication sensor or a presence sensor. An authentication sensor may be used to authenticate an operator (e.g., the customer or owner) of the gun 900. An authentication sensor may include a biometric sensor, such as fingerprint scanner, a vein pattern scanner, a pulse rhythm reader, etc., or an electrical signal reader, such as an NFC reader, an RFID reader, etc. A presence sensor may be used to identify the presence of the operator of the gun 900. A presence sensor may include a time-of-flight sensor, a capacitive touch sensor, a mechanical switch, or the like. The sensor 905-*a*, the sensor 905-*b*, the sensor 905-*c*, the sensor 905-*d*, and the sensor 905-*e* illustrate examples of various sensor sizes. The sensor 905-*a* illustrates an example of a small size circular sensor, the sensor 905-*b* illustrates an example of a medium size circular sensor, and the sensor 905-*c* illustrates an example of a large circular sensor. The sensor 905-*d* illustrates an example of a small ovoidal sensor and the sensor 905-*e* illustrates an example of a large ovoidal sensor. A sensor size may be selected as part of a grip layout prediction procedure.

The backstrap 910 may be constructed of a metal, alloy, plastic, polymer, or the like. The backstrap 910-*a*, the backstrap 910-*b*, and the backstrap 910-*c* illustrate examples of various backstraps sizes. The backstrap 910-*a* illustrates an example of a small backstrap size, the backstrap 910-*b* illustrates an example of a medium backstrap size, and the backstrap 910-*c* illustrates an example of a large backstrap size. In some cases, a custom backstrap size or mold may be generated based on a grip layout prediction procedure. For example, as part of the grip layout prediction procedure, a mold representing the hand of a customer may be generated, and the backstrap 910 may be produced based on the mold. A backstrap size may be selected as part of a grip layout prediction procedure.

Figure 10:
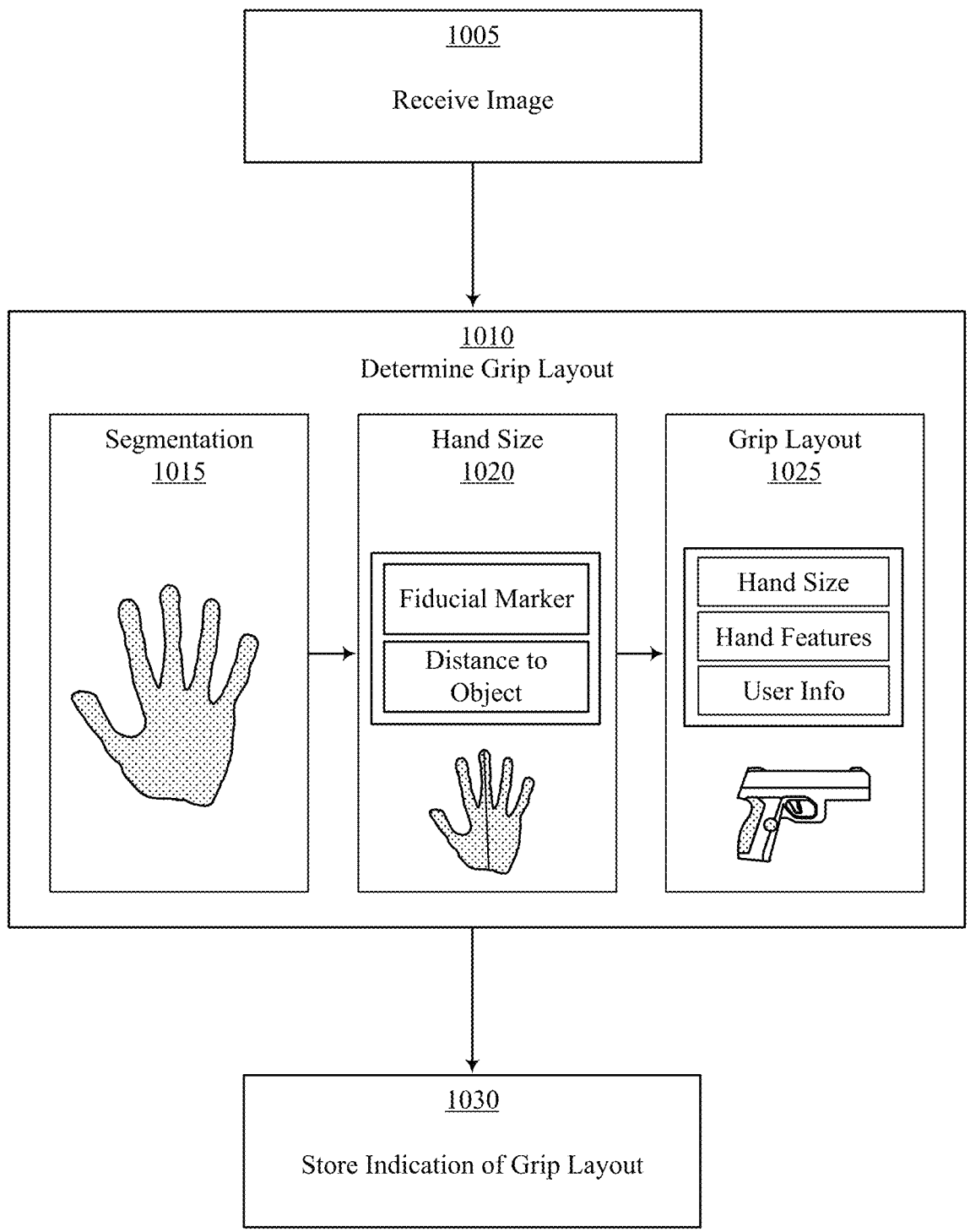
FIG. 10 illustrates an example of a grip layout prediction procedure that uses a machine learning model to determine a grip layout.

FIG. 10 illustrates an example of a grip layout prediction procedure 1000 that uses a machine learning model to determine a grip layout. The grip layout prediction procedure 1000 may be performed by a processor of a device, such as a server, a computer, a user device, a smartphone, or the like. As an illustrative examples, the processor may execute instructions so as to implement a grip layout manager.

The processor may receive an image at step 1005, and the processor may determine a grip layout at step 1010. The processor may receive the image over a wired communication channel or a wireless communication channel. In some examples, the processor may retrieve the image from memory.

At step 1015, the processor may perform a segmentation procedure. The segmentation procedure may be used to identify a hand within the image. The segmentation procedure may additionally identify one or more landmarks in the image. For example, the segmentation process may identify each pixel in the image that corresponds to the hand, and the segmentation process may identify the location of a landmark representing the tip of the third digit and the location of a landmark representing the base of the hand. The segmentation procedure may include threshold segmentation, cluster segmentation, artificial neural network based segmentation, or the like. In some examples, the segmentation may include semantic segmentation based on a convolutional neural network.

At step 1020, the processor may perform a hand sizing procedure. The hand sizing procedure may be based on calibration data, such as a fiducial marker or a distance between the image capturing device and the object (e.g., the hand). For example, the processor may determine an in-image size of the hand by calculating the number of pixels between the tip of the third digit and the base of the hand, and the processor may determine a real size of the hand based on the in-image size of the hand and calibration data.

At step 1025, the processor may perform a layout selection procedure. The layout selection procedure may select a grip layout based on the real size of the hand, one or more hand features, user information, or any combination thereof. A hand feature may include a handedness, a finger size difference, a number of fingers, a length of a finger, or the like. User information (e.g., customer information) may include handedness, a number of users permitted to use the gun, user preferences, or the like. In some examples, user information may be provided by the user in the form of user-input.

In some cases, the layout selection procedure may select the grip layout based on a threshold being satisfied, a decision tree, or a random forest model. For example, a decision tree may be used such that a forward sensor location is selected based on a small size threshold being satisfied. As another example, the decision tree may be used such that a small backstrap size and a rearward sensor location are selected based on two thresholds being satisfied, such as the small size threshold and the uncommon finger difference threshold.

At step 1030, the processor may store an indication of the selected grip layout. In some examples, the processor may store the indication of the selected grip layout, while in some other cases, the processor may transmit a request to store the indication of the selected grip layout. For example, the processor may transmit a message indicating the selected grip layout to a database, and the database may store an indication of the selected grip layout. In some cases, the indication of the selected grip layout may be associated with a customer account. For example, the indication of the selected grip layout may be associated with a unique identifier corresponding to the customer account. The information associated with the customer account may be encrypted or obfuscated such that the information and/or the customer account information is opaque. In some cases, the indication of the selected grip layout may be stored temporarily. For example, the indication of the selected grip layout may be stored in volatile memory such that the indication of the selected grip layout is erased upon system reboot.

Aspects of the grip layout prediction procedure 1000 may be performed by multiple devices or at multiple locations. For example, the segmentation procedure described with reference to step 1015 may be performed at a graphics processing unit (GPU), and the indication of the grip layout may be stored in a database. Aspects of the grip layout prediction procedure 1000 may be performed in various sequences and combination. For example, steps could be added to, or removed from, the procedures described with reference to the grip layout prediction procedure 1000. Similarly, steps could be replaced or reordered. As an example, the processor may request the image and receive the image at step 1005 based on requesting the image. As another example, the processor may refrain from storing the indication of the grip layout at step 1030.

Figure 11:
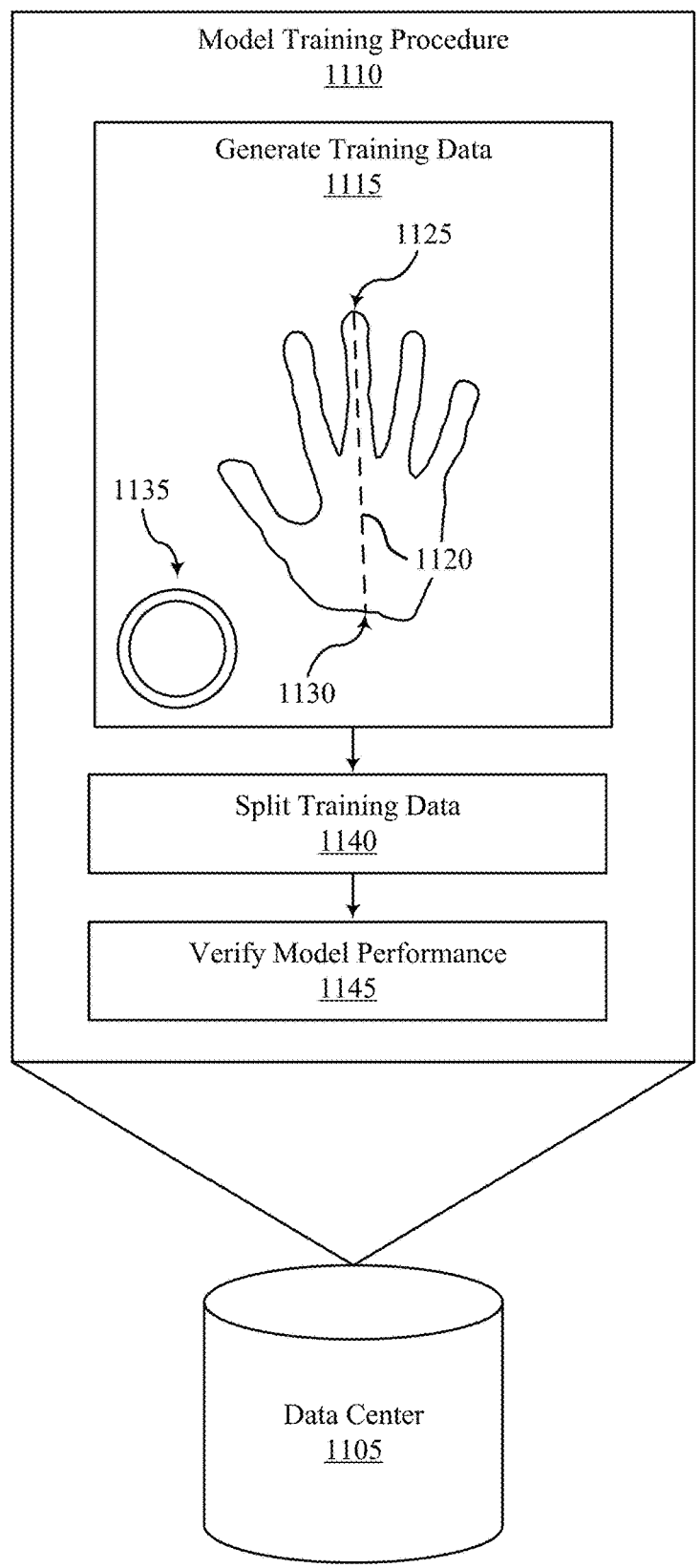
FIG. 11 illustrates an example of a model training procedure.

FIG. 11 illustrates an example of a model training procedure 1110. The model training procedure may be performed at a data center 1105. In some cases, aspects of the model training procedure 1110 may be performed by a central processing unit (CPU), a GPU, a tensor processing unit (TPU), a neural processing unit (NPU), an application-specific integrated circuit (ASIC), or the like.

Training data may be generated at step 1115. The training data may include multiple images depicting hands, and each image of the multiple images may be associated with a label. In some cases, the training images may include an annotation 1120, and the annotation 1120 may indicate the distance from one hand landmark to another hand landmark, such as the distance from the tip of the third digit 1125 to the base of the hand 1130. In some cases, the training images may include a fiducial marker 1135. In some cases, an operator may generate annotations on the training data. For example, the operator may generate an annotation indicating the location of the tip of the third digit 1125 and an annotation indicating the location of the base of the hand 1130. In an additional or alternative example, the operator may generate the annotation 1120 connecting the tip of the third digit 1125 and the base of the hand 1130. The operator may, in some cases, generate an annotation indicating the location of the fiducial marker 1135. An image annotation is an example of an image label.

The training data may be split at step 1140. The training data may be split into training data and evaluation data, where the training data is used to train a model and the evaluation data is used to evaluate the performance of the model. The model may be trained according to the training data, an optimization algorithm (e.g., stochastic gradient descent), and a differentiation algorithm (e.g., backpropagation). As an illustrative example, the model may be trained using the training data, stochastic gradient descent, and backpropagation. It should be understood that other optimization algorithms, such as Adaptive Movement Estimation, Root Mean Squared Propagation, or Momentum may be used.

The model performance may be verified at step 1145. The evaluation data may be used to evaluate the performance of the model. In a classification model, the evaluation data may be used to calculate the accuracy, the precision, or the recall. In a regression model, the evaluation data may be used to calculate the explained variance, the mean squared error, or the $R^2$. A model that generalizes learned information to real-world data is desired, and pruning may be performed as part of the model training procedure 1110 to improve the generalization of the model.

Figure 12:
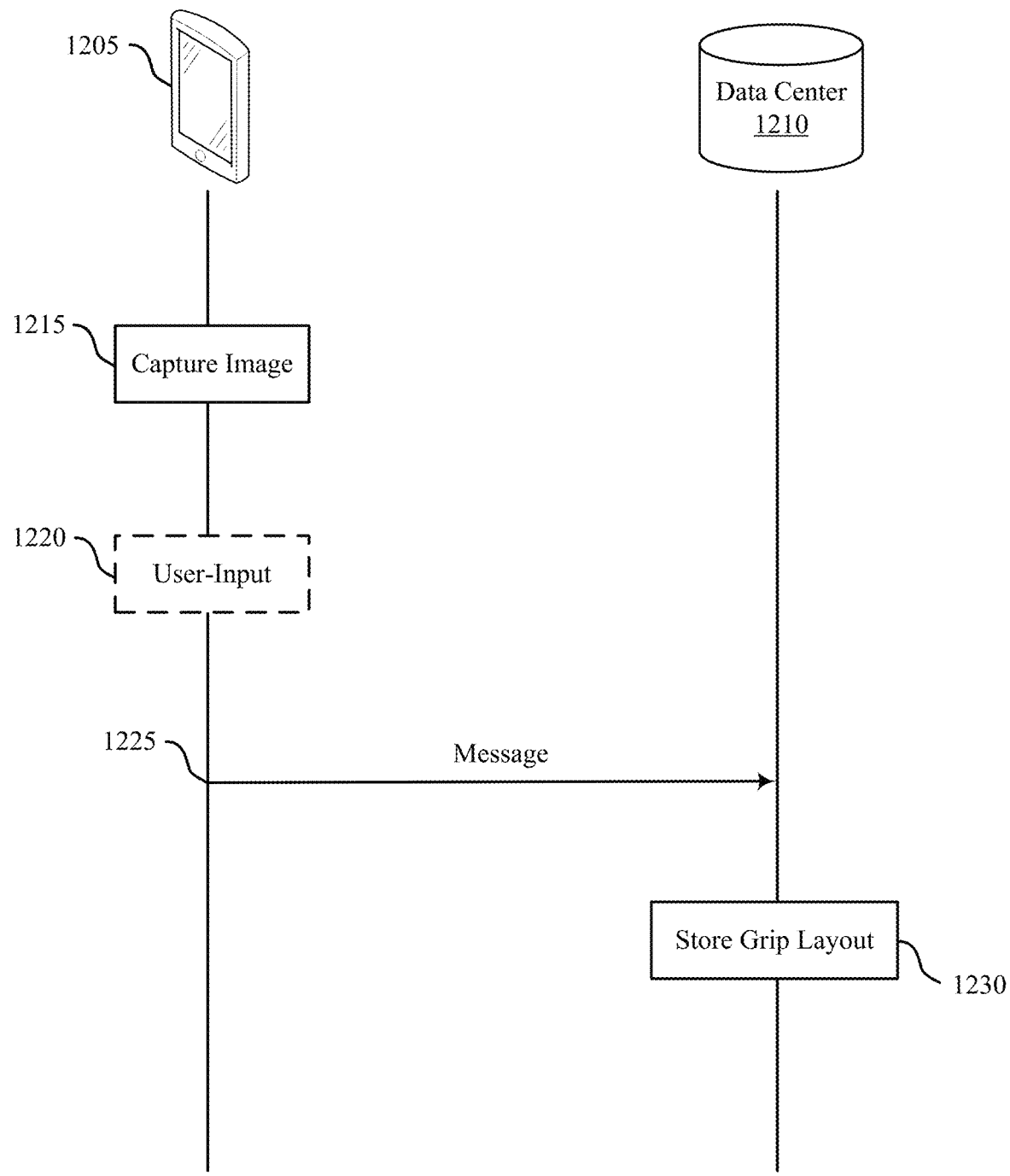
FIG. 12 illustrates an example of a process flow that supports determining a grip layout for a gun.

FIG. 12 illustrates an example of a process flow 1200 that supports determining a grip layout for a gun. A grip layout may improve hand comfort by enhancing the ergonomics of the gun. A grip layout may also facilitate the reliable functioning of the gun, as the gun may include a sensor that interacts with a hand on the grip of the gun, such as a fingerprint scanner that collects a fingerprint or an optical interrupter sensor that determines whether a hand is holding the gun. The process flow 1200 includes a device 1205 and a data center 1210, which may be examples of the corresponding components described with reference to FIGS. 1 through 11. Alternative examples of the following may be implemented, where some steps are performed in a different order than described or are not performed at all. In some cases, steps may include additional features not mentioned below, or further steps may be added.

At step 1215, the device 1205 may capture an image of a hand. The hand may be an actual hand or a profile of a hand. The captured image may be associated with calibration data. For example, the captured image may include a fiducial marker of known size. In another example, the captured image may be associated with metadata indicating a distance between the device 1205 and the hand at the point in time at which the image was captured. The distance may be determined by the device 1205 based on a distance sensor (e.g., an ultrasonic sensor, LiDAR sensor, a time-of-flight sensor, etc.), or a user (e.g., a customer, a gun owner, etc.) may provide user-input to the device 1205 indicating the distance between the device 1205 and the hand at the point in time at which the image was captured.

At step 1220, the device 1205 may receive user input. For example, the device 1205 may generate and display a prompt for user-input within an application (e.g., a mobile application or a web application), and the user may provide user-input in response to the prompt. The user-input may indicate a handedness of the user, a number of users permitted to operate the gun, a piece of calibration data, an account password, or the like.

At step 1225, the device 1205 may transmit a message to the data center. In some examples, the message may contain the captured image, while in some other examples, the message may contain a grip layout. As an examples, the device 1205 may perform a grip layout prediction procedure and transmit the determined grip layout to the data center 1210. As another example, the device 1205 may transmit the captured image to the data center 1210 and the data center 1210 may perform the grip layout prediction procedure. In some cases, an operation may be performed based on the image, and the message may be transmitted based on the performed operation. The operation may include an encryption procedure and/or a compression procedure.

At step 1230, the data center 1210 may store aspects of the grip layout. For example, the data center 1210 may store an indication of the grip layout in a database, and the indication of the grip layout may be linked to a user account. The indication of the grip layout may be encrypted so as to protect user privacy. In some examples, the indication of the grip layout may be used during a gun manufacturing and/or gun assembling procedure. For example, the gun may be manufactured with a fingerprint scanner size determined during a grip layout prediction procedure. As another example, the gun may be assembled with a backstrap size determined during the grip layout prediction procedure.

Figure 13:
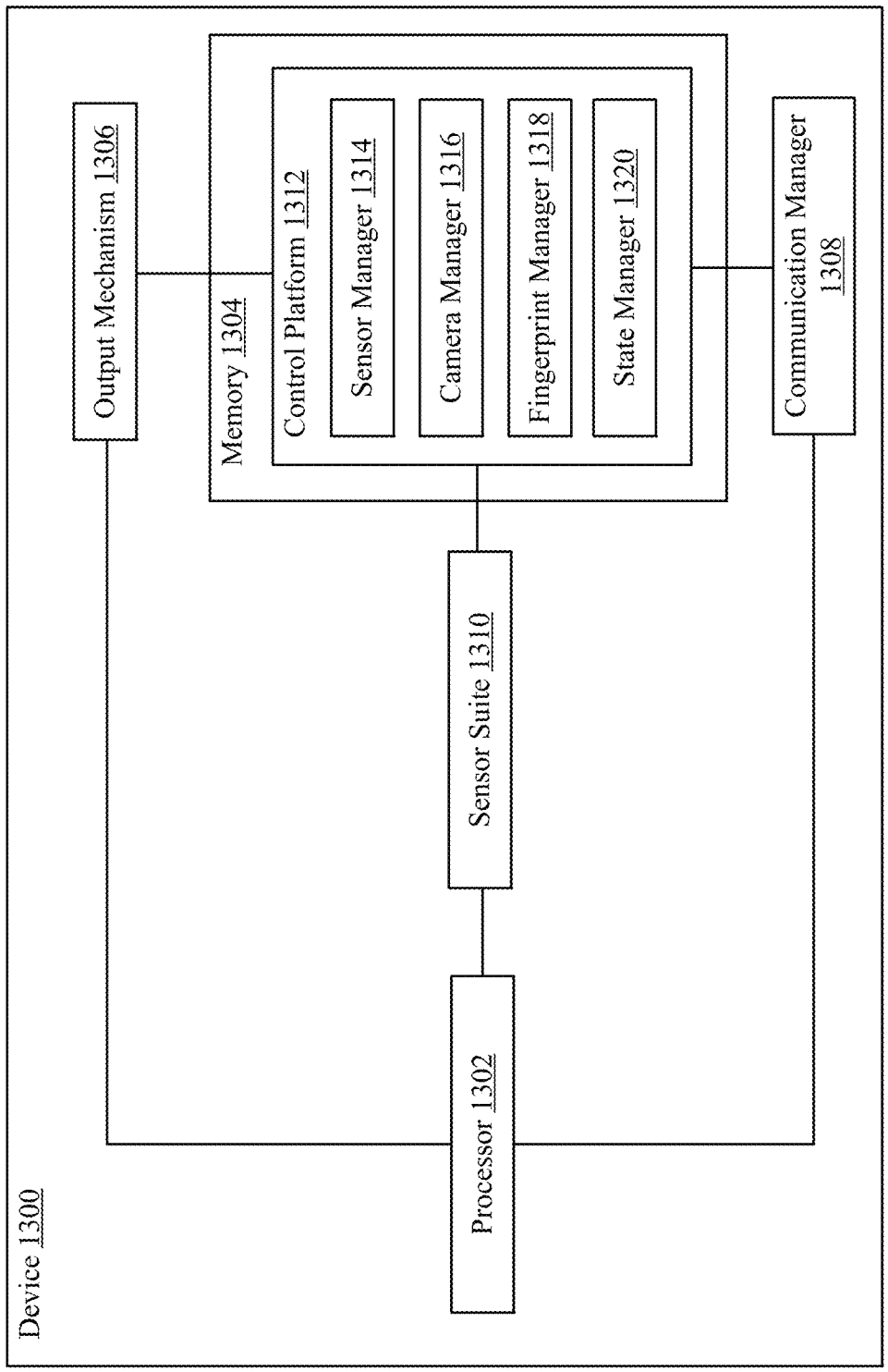
FIG. 13 illustrates an example of a device that supports determining a grip layout.

FIG. 13 illustrates an example of a device 1300 that supports determining a grip layout. The device 1300 is able to implement a control platform 1312 designed to produce outputs that are helpful in ensuring the device 1300 produces appropriate grip layouts. As further discussed below, the control platform 1312 (also referred to as a "management platform" and a "grip layout manager") may be designed to select a grip layout for a customer.

In some embodiments, the control platform 1312 is embodied as a computer program that is executed by the device 1300. In other embodiments, the control platform 1312 is embodied as a computer program that is executed by a computing device to which the device 1300 is communicatively connected. In such embodiments, the device 1300 may transmit relevant information to the computing device for processing as further discussed below. Those skilled in the art will recognize that aspects of the computer program could also be distributed amongst the device 1300 and computing device.

The device 1300 can include a processor 1302, memory 1304, output mechanism 1306, communication manager 1308, and sensor suite 1310. The processor 1302 can have generic characteristics similar to general-purpose processors, or the processor 1302 may be an ASIC that provides control functions to the device 1300. As shown in FIG. 13, the processor 1302 can be coupled with all components of the device 1300, either directly or indirectly, for communication purposes.

The memory 1304 may be comprised of any suitable type of storage medium, such as static random-access memory (SRAM), dynamic random-access memory (DRAM), electrically erasable programmable read-only memory (EEPROM), flash memory, or registers. In addition to storing instructions that can be executed by the processor 1302, the memory 1304 can also store data generated by the processor 1302 (e.g., when executing the modules of the control platform 1312). Note that the memory 1304 is merely an abstract representation of a storage environment. The memory 1304 could be comprised of actual memory chips or managers.

The output mechanism 1306 can be any component that is capable of conveying information to a user of the device 1300. For example, the output mechanism 1306 may be a display panel (or simply "display") that includes LEDs, organic LEDs, liquid crystal elements, or electrophoretic elements. As another example, the output mechanism 1306 may be a loudspeaker (or simply "speaker") that is able to audibly convey information to the user.

The communication manager 1308 may be responsible for managing communications between the components of the device 1300. Additionally or alternatively, the communication manager 1308 may be responsible for managing communications with computing devices that are external to the device 1300. Examples of computing devices include mobile phones, tablet computers, wearable electronic devices (e.g., fitness trackers), and network-accessible server systems comprised of computer servers. Accordingly, the communication manager 1308 may be wireless communication circuitry that is able to establish communication channels with computing devices. Examples of wireless communication circuitry include integrated circuits (also referred to as "chips") configured for Bluetooth®, Wi-Fi®, NFC, and the like.

Sensors are normally implemented in the device 1300. Collectively, these sensors may be referred to as the "sensor suite" 1310 of the device 1300. For example, the device 1300 may include a proximity sensor whose output is indicative of the distance between the sensor and an object. A proximity sensor may include, for example, an emitter that is able to emit infrared (IR) light and a detector that is able to detect reflected IR light that is returned toward the proximity sensor. These types of proximity sensors are sometimes called laser imaging, detection, and ranging (LiDAR) scanners. As another example, the device 1300 may include a fingerprint sensor or camera that generates images which can be used in a grip layout prediction procedure. As shown in FIG. 13, outputs produced by the sensor suite 1310 may be provided to the control platform 1312 for examination or analysis.

For convenience, the control platform 1312 may be referred to as a computer program that resides in the memory 1304. However, the control platform 1312 could be comprised of software, firmware, or hardware components that are implemented in, or accessible to, the device 1300. In accordance with embodiments described herein, the control platform 1312 may include a sensor manager 1314, a camera manager 1316, a fingerprint manager 1318, and a state manager 1320. As an illustrative example, The sensor manager 1314 may process data generated by, and obtained from, a time-of-flight sensor, the camera manager 1316 may process data generated by, and obtained from, a camera, the fingerprint manager 1318 may process data generated by, and obtained from, a fingerprint scanner, and the state manager 1320 may process data generated by, and obtained from, any combination of the sensor manager 1314, the camera manager 1316, and the fingerprint manager 1318. Because the data obtained by these managers may have different formats, structures, and content, the instructions executed by these modules can (and often will) be different. For example, the instructions executed by the sensor manager 1314 to process data generated by the proximity sensor may be different from the instructions generated by the camera manager 1316 to process data generated by the camera. As a specific example, the camera manager 1316 may implement image processing algorithms (e.g., for denoising, despeckling, segmenting, etc.) that are not necessary for processing data generated by a time-of-flight sensor.

Figure 14:
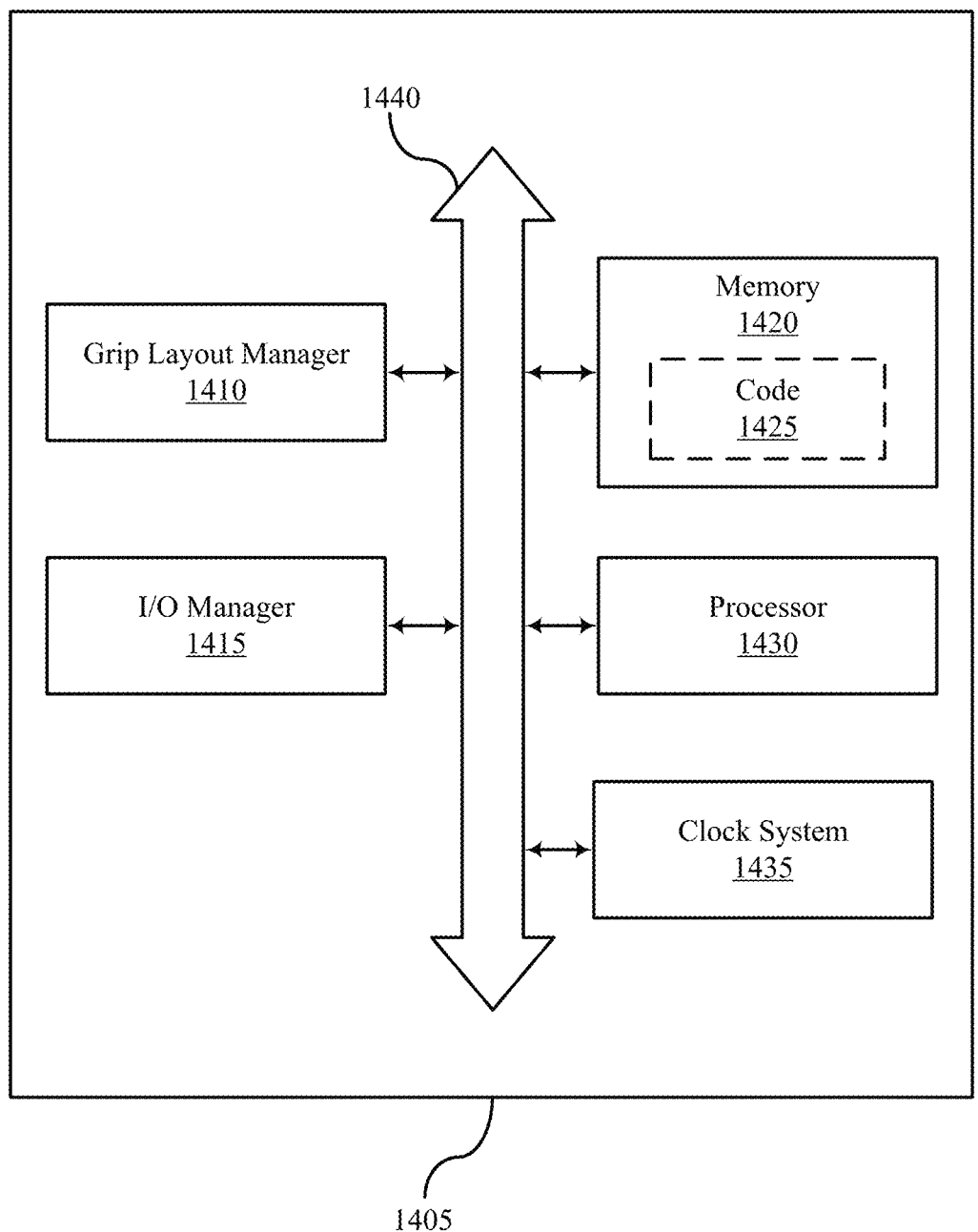
FIG. 14 illustrates an example of a system that supports determining a grip layout.

FIG. 14 illustrates an example of a system 1400 that supports determining a grip layout. The device 1405 may be operable to implement the techniques, technology, or systems disclosed herein. The device 1405 may include components such as a grip layout manager 1410, an input/output (I/O) manager 1415, memory 1420, code 1425, a processor 1430, a clock system 1435, and a bus 1440. The components of the device 1405 may communicate via one or more buses 1440. The device 1405 may be an example of, or include components of, a smartphone, a camera, a tablet, or a computer, as described herein.

The grip layout manager 1410 may receive an image depicting a hand and a fiducial marker indicating a scale, identify a first landmark corresponding to a tip of a third digit of the hand, identify a second landmark corresponding to a base of the hand, calculate, based on the scale, a distance between the first landmark and the second landmark, identify a third landmark corresponding to a tip of a second digit of the hand, calculate, based on the first landmark corresponding to the tip of the third digit of the hand and the third landmark corresponding to the tip of the second digit of the hand, a difference in length of the third digit and the second digit, determine a location on the gun for a biometric sensor based on (i) the distance between the first landmark and the second landmark and (ii) the difference in length of the third digit and the second digit, and transmit a message indicating the determined location such that the determined location is accessible for use in a manufacturing process.

The grip layout manager 1410 may receive an image depicting a hand and a fiducial marker indicating a scale, calculate, based on the fiducial marker indicating the scale, a distance between a first landmark of the hand and a second landmark of the hand, determine that the calculated distance between the first landmark of the hand and the second landmark of the hand satisfies a size threshold, and determine a location on the gun for a sensor based on the determining that the size threshold is satisfied.

The grip layout manager 1410 may receive an image depicting a hand, determine a distance between the hand and an image capturing device used to capture the image, calculate, based on the distance between the hand and the image capturing device, a distance between a first landmark of the hand and a second landmark of the hand, determine that the calculated distance between the first landmark of the hand and the second landmark of the hand satisfies a size threshold, and determine a location on the gun for a sensor based on the determining that the size threshold is satisfied.

The grip layout manager 1410 may receive an image depicting a hand and a fiducial marker, perform object detection on the image to identify the hand and the fiducial marker, perform annotation on the hand based on a machine learning model that has been trained with a first set of training data including multiple images containing hands, where each image of the multiple images of the first set of training data is annotated, and generate a measurement of the hand based on a second machine learning model that has been trained with a second set of training data including multiple images containing hands, where each image of the multiple images of the second set of training data is labeled with a measurement.

The grip layout manager 1410 may display a message prompting a customer to hold a hand in front of a camera, where the camera is coupled with the processor, capture multiple images of the hand with the camera, annotate each image of the multiple images of the hand to identify a tip of a third digit of the hand and a base of the hand in each image of the multiple images, and determine a size of the hand based on the annotating each image of the multiple images.

The I/O manager 1415 may manage input and output signals for the device 1405. The I/O manager 1415 may also manage various peripherals such an input device (e.g., a button, a switch, a touch screen, a dock, a biometric sensor, a pressure sensor, a heat sensor, a proximity sensor, an RFID sensor, etc.) and an output device (e.g., a monitor, a display, an LED, a speaker, a haptic motor, a heat pipe, etc.).

The memory 1420 may include or store code (e.g., software) 1425. The memory 1420 may include volatile memory, such as random-access memory (RAM) and/or non-volatile memory, such as read-only memory (ROM). The code 1425 may be computer-readable and computer-executable, and when executed, the code 1425 may cause the processor 1430 to perform various operations or functions described here.

The processor 1430 may be an example or component of a CPU, an ASIC, or a field programmable gate array (FPGA). In some embodiments, the processor 1430 may utilize an operating system or software such as Microsoft Windows®, iOS®, Android®, Linux®, Unix®, or the like. The clock system 1435 control a timer for use by the disclosed embodiments.

The grip layout manager 1410, or its sub-components, may be implemented in hardware, software (e.g., software or firmware) executed by a processor, or a combination thereof. The grip layout manager 1410, or its sub-components, may be physically located in various positions. For example, in some cases, the grip layout manager 1410, or its sub-components may be distributed such that portions of functions are implemented at different physical locations by one or more physical components.

Figure 15:
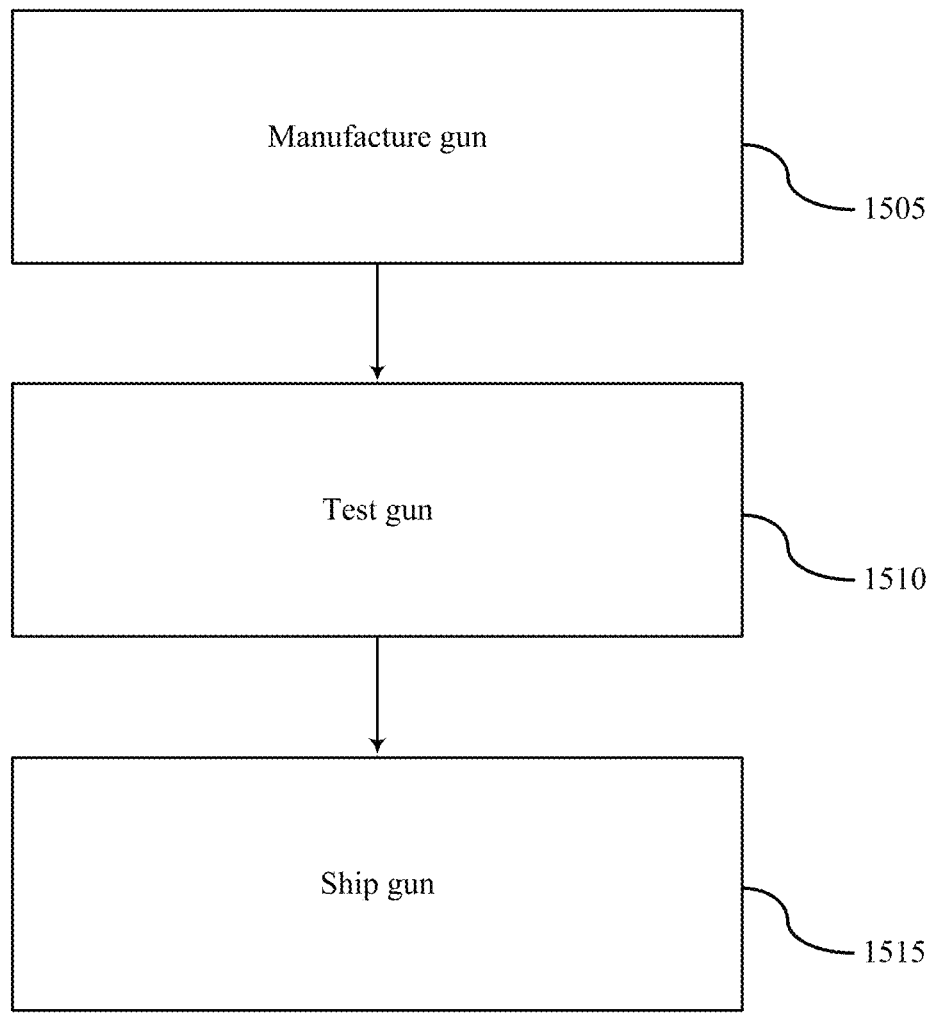
FIG. 15 illustrates an example of a flowchart showing a method of manufacturing a gun with a grip layout configured for a customer.

FIG. 15 illustrates an example of a flowchart 1500 showing a method of manufacturing a gun with a grip layout configured for a customer. Note that while the sequences of the steps performed in the processes described herein are exemplary, the steps can be performed in various sequences and combinations. For example, steps could be added to, or removed from, these processes. Similarly, steps could be replaced or reordered. Thus, the descriptions of these processes are intended to be open ended.

Initially, a gun manufacturer (or simply "manufacturer") may manufacture a gun that is able to implement aspects of the present disclosure (step 1505). For example, the manufacturer may machine, cut, shape, or otherwise make parts to be included in the gun. Thus, the manufacturer may also design those parts before machining occurs, or the manufacturer may verify designs produced by another entity before machining occurs. Additionally or alternatively, the manufacturer may obtain parts that are manufactured by one or more other entities. Thus, the manufacturer may manufacture the gun from components produced entirely by the manufacturer, components produced by other entities, or a combination thereof. Often, the manufacturer will obtain some parts and make other parts that are assembled together to form the gun (or a component of the gun).

The manufacturer may manufacture the gun based on a grip layout determined as part of a grip layout prediction procedure. For example, the manufacturer may manufacture the gun with a sensor (e.g., a fingerprint scanner, a vein pattern scanner, etc.) in a location determined by the grip layout prediction procedure. The location of the sensor may be selected that the sensor is capable of collecting biometric data from the user of the gun as the user naturally grasps the gun. In some examples, the manufacturer may assemble the gun with a backstrap size that was determined during the grip layout prediction procedure. For example, a gun may support multiple different backstrap sizes, and the manufacturer may assemble the gun with a backstrap size determined during the grip layout prediction procedure.

In some embodiments, the manufacturer also generates identifying information related to the gun. For example, the manufacturer may etch (e.g., mechanically or chemically), engrave, or otherwise append identifying information onto the gun itself. As another example, the manufacturer may encode at least some identifying information into a data structure that is associated with the gun. For instance, the manufacturer may etch a serial number onto the gun, and the manufacturer may also populate the serial number (and other identifying information) into a data structure for recording or tracking purposes. Examples of identifying information include the make of the gun, the model of the gun, the serial number, the type of projectiles used by the gun, the caliber of those projectiles, the type of firearm, the barrel length, and the like. In some cases, the manufacturer may record a limited amount of identifying information (e.g., only the make, model, and serial number), while in other cases the manufacturer may record a larger amount of identifying information.

The manufacturer may embed or otherwise couple a sensor with the gun based on a grip layout prediction procedure. For example, the sensor may be coupled with the gun based on the handedness and hand size of a customer. In some examples, the gun frame or receiver may be manufactured to provide an attachment location of the sensor that is based on the grip layout prediction procedure. In some examples the location of the sensor may be fixed for a frame or receiver, while in some other examples, the location of the sensor may be altered within an adjustability region. For example, the sensor may be coupled within the frame or receiver, or the sensor may be coupled with a movable slider that is coupled with the frame or receiver.

The manufacturer may then test the gun (step 1510). In some embodiments, the manufacturer tests all of the guns that are manufactured. In other embodiments, the manufacturer tests a subset of the guns that are manufactured. For example, the manufacturer may randomly or semi-randomly select guns for testing, or the manufacturer may select guns for testing in accordance with a predefined pattern (e.g., one test per 5 guns, 10 guns, or 100 guns). Moreover, the manufacturer may test the gun in its entirety, or the manufacturer may test a subset of its components. For example, the manufacturer may test the component(s) that it manufactures. As another example, the manufacturer may test newly designed components or randomly selected components. Thus, the manufacturer could test select component(s) of the gun, or the manufacturer could test the gun as a whole. For example, the manufacturer may test the sensor to verify the reliability and durability. As another example, the manufacturer may test the barrel to verify that it meets a precision threshold and the cartridge feed system to verify that it meets a reliability threshold. As another example, the manufacturer may test a group of guns (e.g., all guns manufactured during an interval of time, guns selected at random over an interval of time, etc.) to ensure that those guns fire at a sufficiently high pressure (e.g., 70,000 pounds per square inch (PSI)) to verify that a safety threshold is met.

Thereafter, the manufacturer may ship the gun to a dealer (step 1515). In the event that the gun is a firearm, the manufacturer may ship the gun to a Federal Firearms Licensed (FFL) dealer. For example, a purchaser (also referred to as a "customer") may purchase the apparatus through a digital channel or non-digital channel. Examples of digital channels include web browsers, mobile applications, and desktop applications, while examples of non-digital channels include ordering via the telephone and ordering via a physical storefront. In such a scenario, the gun may be shipped to the FFL dealer so that the purchaser can obtain the gun from the FFL dealer. The FFL dealer may be directly or indirectly associated with the manufacturer of the gun. For example, the FFL dealer may be a representative of the manufacturer, or the FFL dealer may sell and distribute guns on behalf of the manufacturer (and possibly other manufacturers).

Note that while the sequences of the steps performed in the processes described herein are exemplary, the steps can be performed in various sequences and combinations. For example, steps could be added to, or removed from, these processes. Similarly, steps could be replaced or reordered. As an example, the manufacturer may iteratively test components while manufacturing the gun, and therefore perform multiple iterations of steps 1505 and 1510 either sequentially or simultaneously (e.g., one component may be tested while another component is added to the gun). Thus, the descriptions of these processes are intended to be open ended.

Figure 16:
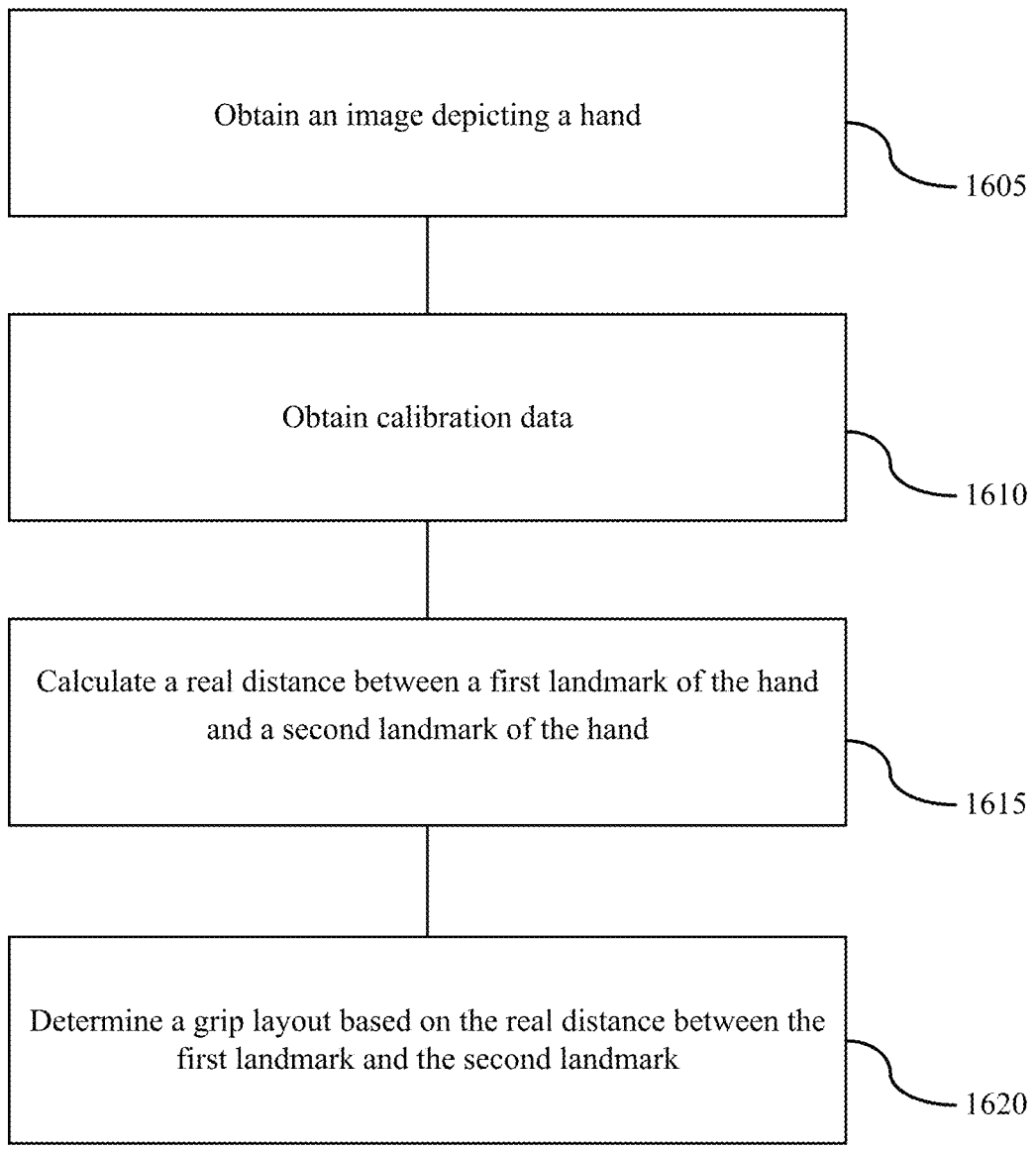
FIG. 16 illustrates an example of a flowchart showing a method of determining a grip layout based on calibration data.

FIG. 16 shows a flowchart illustrating a method 1600 of determining a grip layout based on calibration data. The operations of the method 1600 may be implemented by a grip layout manager, a processor, a computer, a server, a smartphone, or the like. For example, the operations of the method 1600 may be performed by a grip layout manager as described with reference to FIG. 14. In some examples, a device may execute a set of instructions to control the functional elements of the device to perform the described functions. Additionally or alternatively, the device may perform aspects of the described functions using special-purpose hardware.

At step 1605, the device may obtain an image depicting a hand. In some examples, the device may include a camera and generate the image, while in some other examples, the device may receive the image via a wireless communication channel.

At step 1610, the device may obtain calibration data. The calibration data may be included in the image itself, or the calibration data may be included in metadata associated with the image. The calibration data may indicate a scale for the image, or the calibration data may be used to derive the scale for the image. For example, the calibration data may include a fiducial marker, a distance between the image capturing device and the hand at the point in time at which the image was captured, an angular field of view of the image capturing device, or any combination thereof.

At step 1615, the device may calculate a real distance between a first landmark of the hand and a second landmark of the hand. In some examples, the device may calculate an in-image distance between the first landmark of the hand and the second landmark of the hand, and the device may calculate the real distance by using the scale to convert the in-image distance to the real distance. The pixels per metric ratio or the known distance formula may represent the scale of the image. As an example, the device may divide the in-image size of the hand by a pixels per metric ratio to calculate the real distance between the first landmark and the second landmark. As another example, the device may calculate the real distance between the first landmark and the second landmark by solving the known distance formula. In some examples, the first landmark may represent the tip of the third digit and the second landmark may represent the base of the hand.

At step 1620, the device may determine a grip layout based on the real distance between the first landmark and the second landmark. The device may select a backstrap size based on the real distance satisfying a size threshold. The device may select a sensor size based on the real distance satisfying a size threshold. The device may select a sensor location based on the real distance satisfying a size threshold.

Note that while the sequences of the steps performed in the processes described herein are exemplary, the steps can be performed in various sequences and combinations. For example, steps could be added to, or removed from, these processes. Similarly, steps could be replaced or reordered. Thus, the descriptions of these processes are intended to be open ended.

Figure 17:
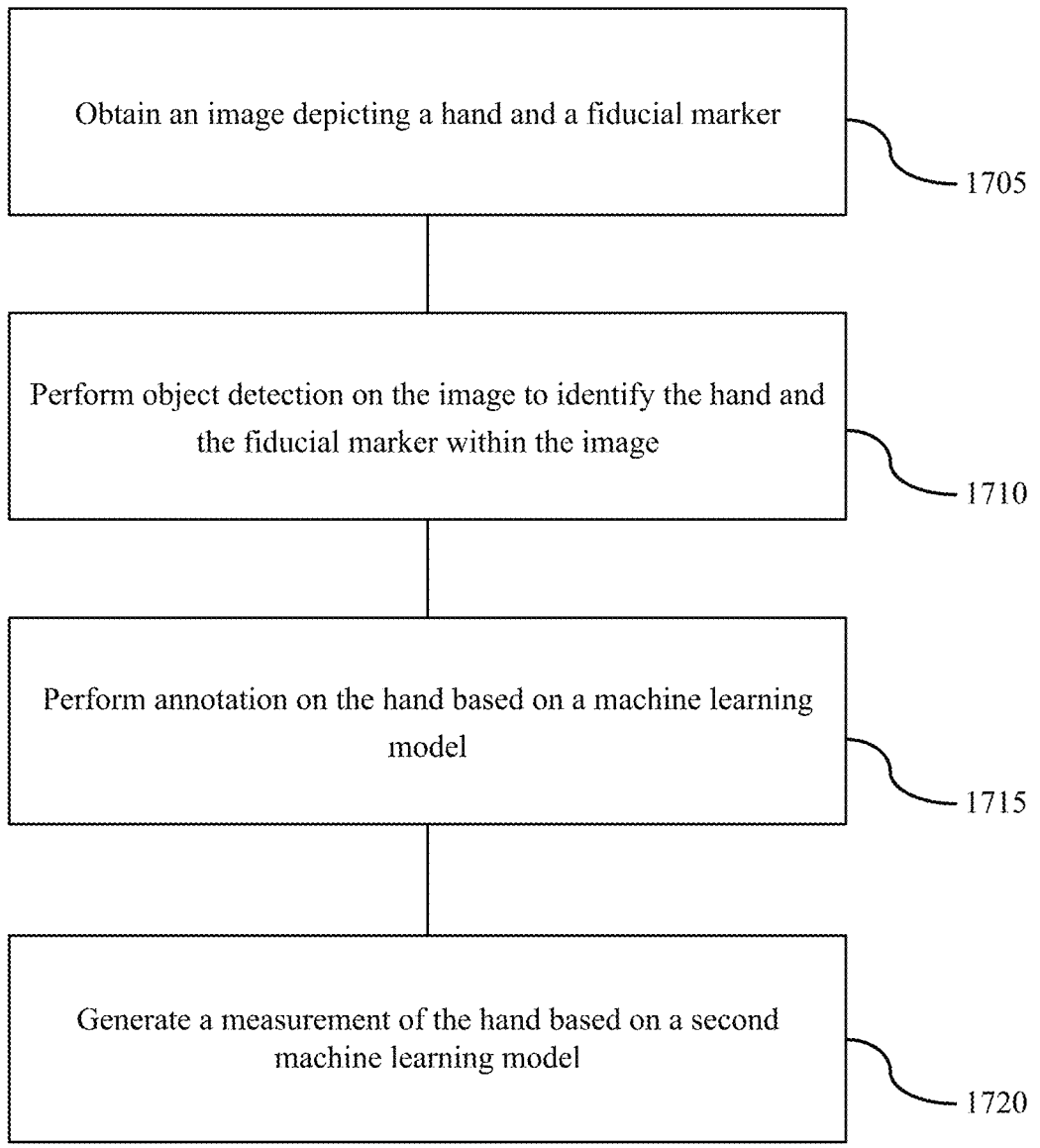
FIG. 17 illustrates an example of a flowchart showing a method of determining a grip layout based on an artificial neural network.

FIG. 17 shows a flowchart illustrating a method 1700 of determining a grip layout based on an artificial neural network. The operations of the method 1700 may be implemented by a grip layout manager, a processor, a computer, a server, a smartphone, or the like. For example, the operations of the method 1700 may be performed by a grip layout manager as described with reference to FIG. 14. In some examples, a device may execute a set of instructions to control the functional elements of the device to perform the described functions. Additionally or alternatively, the device may perform aspects of the described functions using special-purpose hardware.

At step 1705, the device may obtain an image depicting a hand and a fiducial marker. In some examples, the device may generate the image depicting the hand, while in some other examples, the device may receive the image over a wireless communication channel.

At step 1710, the device may perform object detection on the image to identify the hand and the fiducial marker within the image. The device may also perform object detection on the image to identify the tip of the third digit and the base of the hand.

At step 1715, the device may perform annotation on the hand based on a machine learning model. The machine learning model may be an example of an artificial neural network, such as a convolutional neural network. In some examples, the device may perform semantic segmentation on the image and calculate an in-image distance between the tip of the third digit and the base of the hand based on the semantic segmentation. The device may calculate a pixels per metric ratio based on the fiducial marker and convert the in-image distance to a real distance by dividing the in-image distance by the pixels per metric ratio.

At step 1720, the device may generate a measurement of the hand based on a second machine learning model. The second machine learning model may also be an example of an artificial neural network, such as a convolutional neural network.

The device may determine a grip layout based on the measurement of the hand. In some examples, the device may determine that the measurement of the hand is less than a size threshold, and the device may select a backstrap size, a sensor size, a sensor location, or any combination thereof, based on the measurement of the hand being less than the size threshold. In some examples, the device may determine that the measurement of the hand is greater than a size threshold, and the device may select a backstrap size, a sensor size, a sensor location, or any combination thereof, based on the measurement of the hand being greater than the size threshold.

Note that while the sequences of the steps performed in the processes described herein are exemplary, the steps can be performed in various sequences and combinations. For example, steps could be added to, or removed from, these processes. Similarly, steps could be replaced or reordered. Thus, the descriptions of these processes are intended to be open ended.

Figure 18:
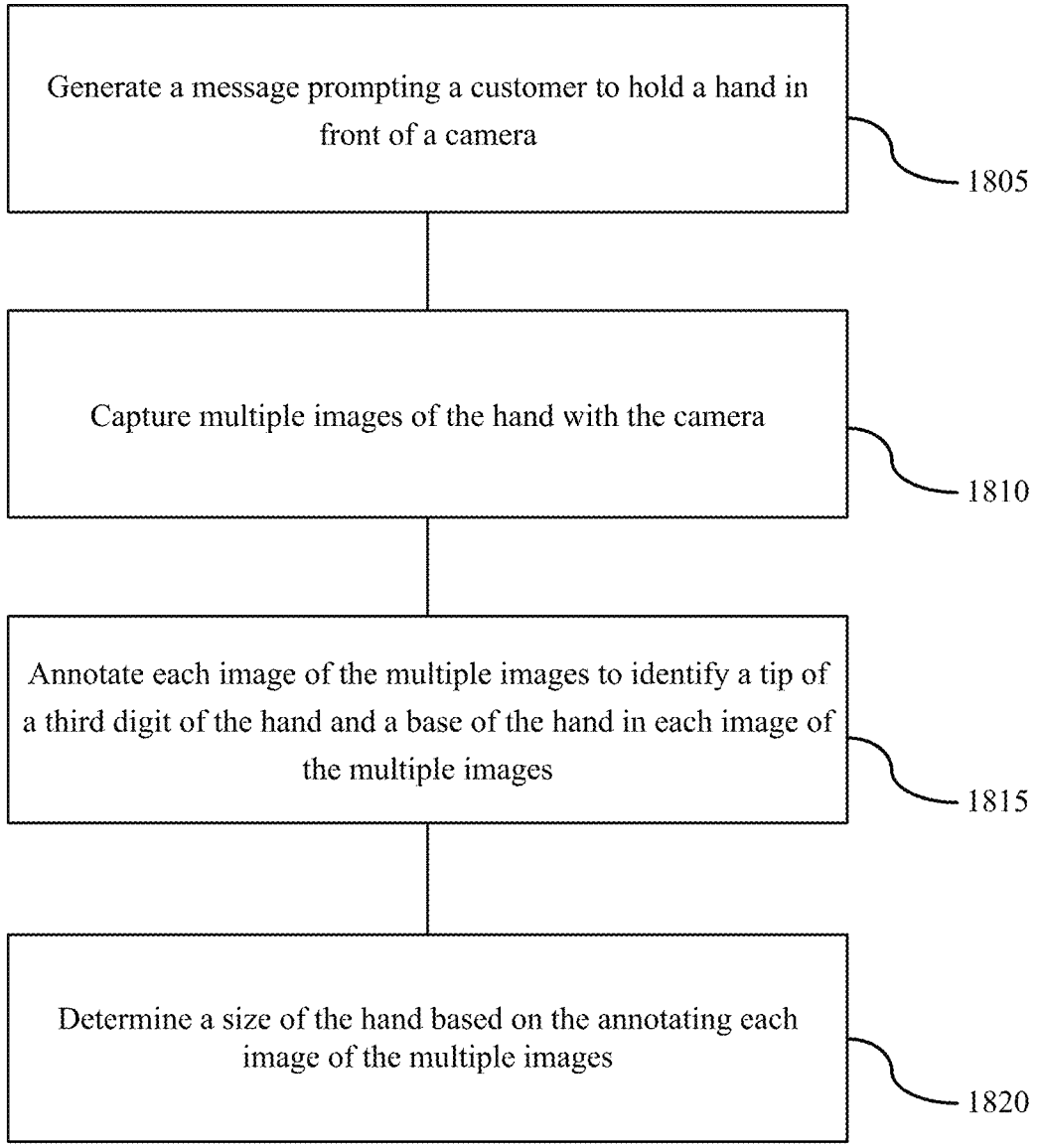
FIG. 18 illustrates an example of a flowchart showing a method of determining a grip layout based on augmented reality.

FIG. 18 shows a flowchart illustrating a method 1800 of determining a grip layout based on augmented reality. The operations of the method 1800 may be implemented by a grip layout manager, a processor, a computer, a server, a smartphone, or the like. For example, the operations of the method 1800 may be performed by a grip layout manager as described with reference to FIG. 14. In some examples, a device may execute a set of instructions to control the functional elements of the device to perform the described functions. Additionally or alternatively, the device may perform aspects of the described functions using special-purpose hardware.

At step 1805, the device may generate a message prompting a customer to hold a hand in front of a camera. The message may be generated via an application, such as a web application, a desktop application, or a mobile application.

At step 1810, the device may capture multiple images of the hand with the camera. The multiple images may depict the hand at different orientations.

At step 1815, the device may annotate each image of the multiple images to identify a tip of a third digit of the hand and a base of the hand in each image of the multiple images. In some examples, the device may annotate each image based on a machine learning model, such as a convolutional neural network.

At step 1820, the device may determine a size of the hand based on annotating each image of the multiple images. In some examples, each annotation may include a number of pixels indicating the number of pixels between the tip of the third digit in the image and the base of the hand in the image, and the device may convert the number of pixels (e.g., the in-image size) to a metric or standard measurement (e.g., the real size) by dividing the number of pixels by a pixels per metric ratio.

The device may determine a grip layout based on the size of the hand. In some examples, the device may determine that the size of the hand is less than a size threshold, and the device may select a backstrap size, a sensor size, a sensor location, or any combination thereof, based on the size of the hand being less than the size threshold. In some examples, the device may determine that the size of the hand is greater than a size threshold, and the device may select a backstrap size, a sensor size, a sensor location, or any combination thereof, based on the size of the hand being greater than the size threshold.

Note that while the sequences of the steps performed in the processes described herein are exemplary, the steps can be performed in various sequences and combinations. For example, steps could be added to, or removed from, these processes. Similarly, steps could be replaced or reordered. Thus, the descriptions of these processes are intended to be open ended.

EXAMPLES

Several aspects of the present disclosure are set forth examples. Note that, unless otherwise specified, all of these examples can be combined with one another. Accordingly, while a feature may be described in the context of a given example, the feature may be similarly applicable to other examples.

In some examples, the techniques described herein relate to a method of determining a grip layout for a gun, the method including: obtaining an image depicting of a hand and a fiducial marker indicating a scale; identifying a first landmark corresponding to a tip of a third digit of the hand; identifying a second landmark corresponding to a base of the hand; calculating, based on the scale indicated by the fiducial marker, a real distance between the first landmark and the second landmark; identifying a third landmark corresponding to a tip of a second digit of the hand; calculating, based on the scale indicated by the fiducial marker, a difference in length of the third digit and the second digit; and determining a backstrap size for the gun based on (i) the real distance between the first landmark and the second landmark and (ii) the difference in length of the third digit and the second digit.

In some examples, the techniques described herein relate to a method of determining a grip layout for a gun, the method including: obtaining an image depicting a hand and a fiducial marker indicating a scale; calculating, based on the fiducial marker indicating the scale, a real distance between a first landmark of the hand and a second landmark of the hand; determining that the real distance between the first landmark of the hand and the second landmark of the hand satisfies a size threshold; and determining a backstrap size for the gun based on the real distance between the first landmark and the second landmark satisfying the size threshold.

In some examples, the techniques described herein relate to a method, further including: determining, based on the real distance between the first landmark and the second landmark, a location on the gun for a sensor.

In some examples, the techniques described herein relate to a method, further including: determining a handedness of a customer based on the image depicting the hand, wherein the location on the gun for the sensor is further based on the handedness of the customer.

In some examples, the techniques described herein relate to a method, further including: manufacturing the gun with the sensor in the determined location, wherein the gun includes a firearm.

In some examples, the techniques described herein relate to a method, further including: determining a size of a sensor based on the real distance between the first landmark and the second landmark; and manufacturing the gun with the sensor of the determined size.

In some examples, the techniques described herein relate to a method, further including: receiving user-input indicating a number of users permitted to operate the gun, wherein the determining the backstrap size is further based on the user-input.

In some examples, the techniques described herein relate to a method, further including: identifying a third landmark of the hand representing a tip of an additional digit, wherein the additional digit includes a second digit or a fourth digit; calculating, based on the first landmark representing a tip of a third digit and the third landmark representing the tip of the additional digit, a difference in length of the third digit and the additional digit; and determining that the difference in length of the third digit and the additional digit satisfies a finger difference threshold, wherein the backstrap size is further based on the difference in length satisfying the finger difference threshold.

In some examples, the techniques described herein relate to a method, wherein a probability of a randomly selected hand satisfying the finger difference threshold is less than 25 percent.

In some examples, the techniques described herein relate to a method, further including: storing an indication of the backstrap size in a database system, wherein the gun is assembled with a backstrap component of the determined backstrap size based on the indication of the backstrap size.

In some examples, the techniques described herein relate to a method, further including: obtaining a second image depicting a second hand and a second fiducial marker indicating a second scale; calculating, based on the second fiducial marker indicating the second scale, a second real distance between a first landmark of the second hand and a second landmark of the second hand; and determining that the second real distance between the first landmark of the second hand and the second landmark of the second hand satisfies a second size threshold, wherein the determining the backstrap size for the gun is further based on the second real distance between the first landmark of the second hand and the second landmark of the second hand satisfying the second size threshold.

In some examples, the techniques described herein relate to a method, wherein the first landmark represents a tip of a third digit and wherein the second landmark represents a base of the hand.

In some examples, the techniques described herein relate to a method, wherein the hand depicted in the image includes a three-dimensional hand or a two-dimensional hand profile.

In some examples, the techniques described herein relate to a method, wherein the fiducial marker includes a grid of known dimensions or an icon of known dimensions.

In some examples, the techniques described herein relate to a method, wherein the real distance between the first landmark and the second landmark represents a size of the hand.

In some examples, the techniques described herein relate to a method, further including: calculating an in-image distance between the first landmark and the second landmark; and converting the in-image distance to the real distance based on the scale indicated by the fiducial marker.

In some examples, the techniques described herein relate to a method of determining a grip layout for a gun, the method including: obtaining an image depicting a hand and metadata indicating a distance between a device used to capture the image and the hand depicted in the image at the point in time at which the image was captured; calculating, based on the distance between the device and the hand, a real distance between a first landmark of the hand and a second landmark of the hand; determining that the real distance between the first landmark and the second landmark satisfies a size threshold; and determining a backstrap size for the gun based on the real distance between the first landmark and the second landmark satisfying the size threshold.

In some examples, the techniques described herein relate to a method, further including: determining, based on the real distance between the first landmark and the second landmark, a location on the gun for a sensor.

In some examples, the techniques described herein relate to a method, further including: determining a handedness of a customer based on the image depicting the hand, wherein the location on the gun for the sensor is further based on the handedness of the customer.

In some examples, the techniques described herein relate to a method, further including: manufacturing the gun with the sensor in the determined location, wherein the gun includes a firearm.

In some examples, the techniques described herein relate to a method, further including: determining an angular field of view of the device, wherein the calculating the real distance between the first landmark and the second landmark is further based on the angular field of view.

In some examples, the techniques described herein relate to a method, further including: using a known distance formula to calculate a size of the hand, wherein the size of the hand is defined by the real distance between a tip of a third digit and a base of the hand.

In some examples, the techniques described herein relate to a method, further including: determining a size of a sensor based on the real distance between the first landmark and the second landmark.

In some examples, the techniques described herein relate to a method, further including: receiving user-input indicating a number of users permitted to operate the gun, wherein the determining the backstrap size is further based on the user-input.

In some examples, the techniques described herein relate to a method, further including: calculating an in-image distance between the first landmark and the second landmark; and converting the in-image distance to the real distance based on an angular field of view of the device and the distance between the device and the hand.

In some examples, the techniques described herein relate to a method of determining a grip layout for a gun, the method including: obtaining an image depicting a hand and a fiducial marker; performing object detection on the image to identify the hand and the fiducial marker within the image; performing annotation on the hand based on a machine learning model that has been trained with a first set of training data including multiple images containing hands, wherein each image of the multiple images of the first set of training data is annotated; and generating a measurement of the hand based on a second machine learning model that has been trained with a second set of training data including multiple images containing hands, wherein each image of the multiple images of the second set of training data is labeled with a measurement.

In some examples, the techniques described herein relate to a method, further including: generating a handedness prediction based on a third machine learning model that has been trained with a third set of training data including multiple images containing hands, wherein each image of the multiple images of the third set of training data is labeled as a left hand or a right hand.

In some examples, the techniques described herein relate to a method, further including: performing object detection on the image to identify a first digit of the hand, wherein the handedness prediction is further based on the first digit of the hand.

In some examples, the techniques described herein relate to a method, wherein each image of the multiple images of the first set of training data is annotated from a tip of a third digit of the hand to a base of the hand.

In some examples, the techniques described herein relate to a method of determining a grip layout for a gun, the method including: generating a message prompting a customer to hold a hand in front of a camera; capturing multiple images of the hand with the camera; annotating each image of the multiple images to identify a tip of a third digit of the hand and a base of the hand in each image of the multiple images; and determining a size of the hand based on the annotating each image of the multiple images.

In some examples, the techniques described herein relate to a method, further including: receiving, via a touch screen, a selection of a region indicating a location of the tip of the third digit and a location of the base of the hand, wherein the annotating each image is based on the selection of the region.

In some examples, the techniques described herein relate to a method, further including: generating a second message prompting the customer to enter a length of the hand; and receiving, from the customer, a user-input indicating the length of the hand.

In some examples, the techniques described herein relate to a method, wherein the size of the hand is defined by the length of the hand indicated by the user-input.

In some examples, the techniques described herein relate to a method, wherein the annotating each image is based on a model trained on a set of training data including multiple images containing hands, wherein each image of the multiple images of the training data is annotated to identify a location of a tip of a third digit of the hand in the image and a location of a base of the hand in the image.

In some examples, the techniques described herein relate to a method, wherein at least one image of the multiple images contains a fiducial marker indicating a scale, and wherein the determining the size of the hand is further based on the fiducial marker indicating the scale.

Remarks

The Detailed Description provided herein, in connection with the drawings, describes example configurations and does not represent all the examples that may be implemented or that are within the scope of the claims. The term "example" used herein means "serving as an illustration or instance," and not "a preferred example."

The functions described herein may be implemented with a controller. A controller may include a grip layout manager, a special-purpose processor, a general-purpose processor, a digital signal processor (DSP), a CPU, a graphics processing unit (GPU), a microprocessor, a tensor processing unit (TPU), a neural processing unit (NPU), an image signal processor (ISP), a hardware security module (HSM), an ASIC, a programmable logic device (such as an FPGA), a state machine, a circuit (such as a circuit including discrete hardware components, analog components, or digital components), or any combination thereof. Some aspects of a controller may be programmable, while other aspects of a control may not be programmable. In some examples, a digital component of a controller may be programmable (such as a CPU), and in some other examples, an analog component of a controller may not be programmable (such as a differential amplifier).

In some cases, instructions or code for the functions described herein may be stored on or transmitted over a computer-readable medium, and components implementing the functions may be physically located at various locations. Computer-readable media includes both non-transitory computer storage media and communication media. A non-transitory storage medium may be any available medium that may be accessed by a computer or component. For example, non-transitory computer-readable media may include RAM, SRAM, DRAM, ROM, EEPROM, flash memory, magnetic storage devices, or any other non-transitory medium that may be used to carry and/or store program code means in the form of instructions and/or data structures. The instructions and/or data structures may be accessed by a special-purpose processor, a general-purpose processor, a manager, or a controller. A computer-readable media may include any combination of the above, and a compute component may include computer-readable media.

In the context of the specification, the term "left" means the left side of the gun when the gun is held in an upright position, where the term "upright position" generally refers to a scenario in which the gun is oriented as if in a high-ready position with the barrel roughly parallel to the ground. The term "right" means the right side of the gun when the gun is held in the upright position. The term "front" means the muzzle end (also referred to as the "distal end") of the gun, and the term "back" means the grip end (also referred to as the "proximal end") of the gun. The terms "top" and "bottom" mean the top and bottom of the gun as the gun is held in the upright position. The relative positioning terms such as "left," "right," "front," and "rear" are used to describe the relative position of components. The relative positioning terms are not intended to be limiting relative to a gravitational orientation, as the relative positioning terms are intended to be understood in relation to other components of the gun, in the context of the drawings, or in the context of the upright position described above.

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method of determining a grip layout for a gun, the method comprising:
    obtaining (i) an image depicting a hand and (ii) metadata associated with the image, wherein the metadata indicates a distance between a device used to capture the image and the hand depicted in the image at a point in time at which the image was captured;
    calculating, based on the distance between the device and the hand, a real distance between a first landmark of the hand and a second landmark of the hand;
    determining that the real distance between the first landmark and the second landmark satisfies a size threshold;
    selecting a backstrap size for the gun based on the real distance between the first landmark and the second landmark satisfying the size threshold;
    selecting, based on the real distance between the first landmark and the second landmark satisfying the size threshold, a location on the gun for a fingerprint sensor; and
    manufacturing the gun with the selected backstrap size and the fingerprint sensor in the selected location.

2. A method of determining a grip layout for a gun, the method comprising:
    obtaining an image depicting a hand and metadata indicating a distance between a device used to capture the image and the hand depicted in the image at a point in time at which the image was captured;
    calculating, based on the distance between the device and the hand, a real distance between a first landmark of the hand and a second landmark of the hand;
    determining that the real distance between the first landmark and the second landmark satisfies a size threshold; and
    selecting a backstrap size for the gun based on the real distance between the first landmark and the second landmark satisfying the size threshold.

3. The method of claim 2, further comprising:
    selecting, based on the real distance between the first landmark and the second landmark, a location on the gun for a sensor.

4. The method of claim 2, further comprising:
    selecting, based on the real distance between the first landmark and the second landmark, a location on the gun for a sensor; and
    determining a handedness of a customer based on the image depicting the hand, wherein the location on the gun for the sensor is further based on the handedness of the customer.

5. The method of claim 2, further comprising:
    selecting, based on the real distance between the first landmark and the second landmark, a location on the gun for a sensor; and
    manufacturing the gun with the sensor in the selected location, wherein the gun comprises a firearm.

6. The method of claim 2, further comprising:
    determining an angular field of view of the device, wherein the calculating the real distance between the first landmark and the second landmark is further based on the angular field of view.

7. The method of claim 2, further comprising:
    determining an angular field of view of the device, wherein the calculating the real distance between the first landmark and the second landmark is further based on the angular field of view; and
    using a known distance formula to calculate a size of the hand, wherein the size of the hand is defined by the real distance between a tip of a third digit and a base of the hand.

8. The method of claim 2, further comprising:
    selecting a size of a sensor based on the real distance between the first landmark and the second landmark.

9. The method of claim 2, further comprising:
    receiving user-input indicating a number of users permitted to operate the gun, wherein the selecting the backstrap size is further based on the user-input.

10. The method of claim 2, further comprising:
- calculating an in-image distance between the first landmark and the second landmark; and
- converting the in-image distance to the real distance based on an angular field of view of the device and the distance between the device and the hand.

11. A method of determining a grip layout for a gun, the method comprising:
- obtaining an image depicting a hand and metadata indicating a distance between a device used to capture the image and the hand depicted in the image at a point in time at which the image was captured;
- calculating, based on the distance between the device and the hand, a real distance between a first landmark of the hand and a second landmark of the hand;
- determining that the real distance between the first landmark and the second landmark satisfies a size threshold; and
- selecting, based on the real distance between the first landmark and the second landmark satisfying the size threshold, a location on the gun for a sensor.

12. The method of claim 11, further comprising:
- determining, based on the image depicting the hand, a handedness of a customer of the gun, wherein the location on the gun for the sensor is further based on the handedness of the customer.

13. The method of claim 11, further comprising:
- obtaining, from a customer of the gun, user-input indicating a handedness, wherein the location on the gun for the sensor is further based on the handedness of the customer.

14. The method of claim 11, further comprising:
- generating an output indicating a predicted handedness of a customer of the gun based on an artificial neural network that is configured to take the image as input and generate the output; and
- determining, based on the output, a handedness of the customer of the gun, wherein the location on the gun for the sensor is further based on the handedness of the customer.

15. The method of claim 11, wherein the sensor is a fingerprint sensor.

16. The method of claim 11, wherein the sensor is a fingerprint sensor, and wherein the gun is configured to be operable in response to the fingerprint sensor capturing a fingerprint of an authorized user.

17. The method of claim 11, wherein the sensor is a proximity sensor.

18. The method of claim 11, wherein the sensor is a proximity sensor, and wherein the proximity sensor is configured to cause the gun to transition power states based on whether an object is within a threshold distance of the proximity sensor.

\* \* \* \* \*